United States Patent
Iacobelli et al.

(10) Patent No.: US 7,035,335 B1
(45) Date of Patent: Apr. 25, 2006

(54) TRANSPORT STREAM PARSER

(75) Inventors: Franco Iacobelli, Sunnyvale, CA (US); Rajesh L. Motwani, Fremont, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1072 days.

(21) Appl. No.: 09/854,586

(22) Filed: May 11, 2001

(51) Int. Cl.
*H04N 7/12* (2006.01)

(52) U.S. Cl. .............................. 375/240.25; 375/240.26

(58) Field of Classification Search ........... 375/240.25, 375/240.26; 370/392, 396, 473; 725/100, 725/131, 139, 151
See application file for complete search history.

(56) References Cited

U.S. PATENT DOCUMENTS

| | | | |
|---|---|---|---|
| 5,841,472 A * | 11/1998 | Rim et al. ............. | 375/240.25 |
| 6,226,291 B1 * | 5/2001 | Chauvel et al. ............. | 370/392 |
| 6,510,554 B1 * | 1/2003 | Gordon et al. ................ | 725/90 |
| 2002/0106018 A1 * | 8/2002 | D'Luna et al. ........ | 375/240.01 |
| 2005/0122341 A1 * | 6/2005 | MacInnis et al. ........... | 345/558 |

* cited by examiner

*Primary Examiner*—Vu Le

(57) ABSTRACT

A transport stream parser is described. In particular, the transport stream parser is incorporated in a host system such as a set top box. The transport stream parser operates on a data stream having a plurality of packets that have MPEG data. Specifically, sometime after the transport stream is received by the host system, the transport stream is directed to the transport stream parser. The transport stream parser selects TS (transport stream) packets from the transport stream by searching for a first plurality of codes in a first portion of each TS packet. Moreover, the transport stream parser scans a data payload of the selected TS packets for a second plurality of codes to determine a plurality of parsing result codes. In addition, the transport stream parser adds a parsing result word having the parsing result codes to each TS packet.

41 Claims, 25 Drawing Sheets

Adaptation Field Control (AF) values

| Code | Description |
| --- | --- |
| 00 | Reserved |
| 01 | No Adaptation Field, data only |
| 10 | Adaptation Field only, no data |
| 11 | Adaptation Field followed by data |

Header Designator (HD) values

| Code | Description |
| --- | --- |
| 0000 | Auxiliary data |
| 01x0 | MPEG video data |
| 10x0 | Redundant data followed by MPEG video data |
| 11x0 | Non-MPEG data followed by MPEG video data |

TRANSPORT STREAM PARSER

BACKGROUND OF THE INVENTION

1. Field of the Invention

The present invention relates to data stream parsers. More particularly, the present invention relates to the field of parsing techniques to facilitate decoding a data stream.

2. Related Art

Digital transmission techniques have evolved to provide a multitude of options to a receptive television audience. Information digitally transmitted via satellite, cable, or terrestrial transmitters can have TV programs (e.g., video and audio) as well as interactive programs and additional data material (e.g., audio in multiple languages, text for the hearing impaired, etc.). Typically, the digital transmission (e.g., a data stream having many packets) is scrambled to protect intellectual property rights and to limit the reception of the digital transmission to a television audience that has paid for the right to receive the digital transmission. A variety of unauthorized techniques have evolved to descramble the data stream without permission.

As a result, emphasis had been placed in improving data security within an authorized receiver such as a set top box. In particular, a set top box having a higher level of data security facilitates protecting intellectual property rights and limiting the reception of the data stream to a television audience that has paid for the right to receive the data stream. A variety of data security techniques have been implemented.

However, many of these data security techniques interfere with the decoding of the data stream. For example, within the set top box, the data stream may remain encrypted even when transferred from one location to another location in the set top box. Thus, the processor of the set top box has to decrypt and scan the data stream so that to send the appropriate portion of the encrypted data stream to the decoder of the set top box. For example, during Trick Mode operation (e.g., fast forward, fast reverse, etc.), only packets having particular MPEG video frames are sent to a MPEG decoder. Unfortunately, this decryption/scanning procedures can overwhelm the processor and slow down the speed of decoding the data stream. Moreover, the unauthorized techniques can exploit the processor's ability to decrypt the data stream. In another implementation, the processor of the set top box is unable to decrypt the encrypted data stream. Hence, the processor has to send most of the encrypted data stream to the decoder, forcing the decoder to decrypt and to scan the data stream to locate the appropriate portion of the data stream (e.g., for supporting a Trick Mode operation). The decryption/scanning procedures overwhelm the decoder and slow down the speed of decoding the data, sometimes preventing the data from being decoded.

SUMMARY OF THE INVENTION

A transport stream parser is described. In particular, the transport stream parser is incorporated in a host system such as a set top box. The transport stream parser operates on a data stream having a plurality of packets that have MPEG data. The data stream can be a transport stream compliant with a Digital Video Broadcast (DVB) standard, a transport stream compliant with a Digital Satellite System (DSS) broadcast standard, or any other type of transport stream.

Specifically, sometime after the transport stream is received by the host system, the transport stream is directed to the transport stream parser. The transport stream parser selects TS (transport stream) packets from the transport stream by searching for a first plurality of codes in a first portion of each TS packet. The host system programs the transport stream parser with criteria for selecting TS packets from the transport stream. Moreover, the transport stream parser scans the data payload of the selected TS packets for a second plurality of codes to determine a plurality of parsing result codes. The second plurality of codes identify the start of a video PES (packetized elementary stream) and identify the start of a MPEG video frame. In addition, the transport stream parser adds a parsing result word having the parsing result codes to each TS packet. In an embodiment, the parsing result word is 32 bits long.

As the TS packets are routed to the mass storage device of the host system, the parsing result word in each TS packet is identified and used by the host processor (which executes host software) of the host system to generate an index table. The index table indicates to the host processor the TS packets in which the start of a video PES is located and indicates to the host processor the TS packets in which the start of a MPEG video frame is located. Hence, during Trick Mode operation (e.g. fast forward, fast reverse, etc.), the host processor is able to send to the MPEG decoder of the host system the particular TS packets having particular MPEG video frames (e.g., I-Frames) rather than sending most of the TS packets which can then overwhelm the MPEG decoder attempting to perform a Trick Mode operation.

The transport stream parser provides numerous benefits. First, the transport stream parser relieves the host processor from performing the tedious decrypting/scanning tasks on the transport stream. Secondly, the transport stream parser makes Trick Mode operation possible without compromising the data security of the host system. In particular, in highly secure host systems, the TS packets of the transport stream are encrypted before the TS packets are transferred to the main memory of the host system and to the mass storage device of the host system. Thus, the host processor may not be able to scan the TS packets since the TS packets are already encrypted before the host processor accesses the TS packets and since the host processor may be unable to decrypt the TS packets.

These and other advantages of the present invention will no doubt become apparent to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the present invention.

FIG. 3C illustrates a table showing the Adaptation Field Control values.

FIG. 4C illustrates a table showing the Header Designator (HD) values.

The drawings referred to in this description should not be understood as being drawn to scale except if specifically noted.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
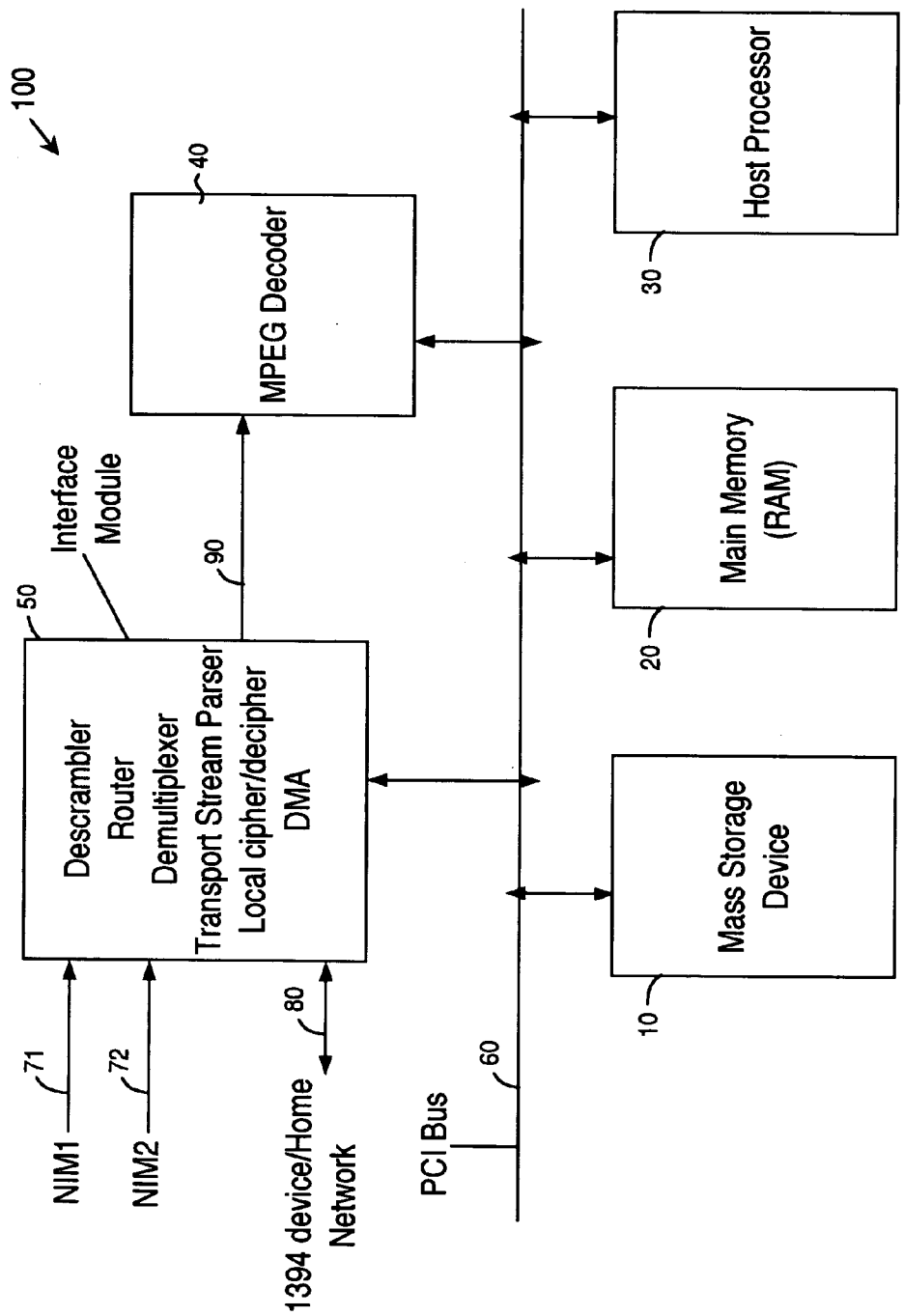
FIG. 1 illustrates a block diagram of a set top box in which the present invention can be practiced.

FIG. 1 illustrates a block diagram of a set top box 100 in which the present invention can be practiced. The transport stream parser of the present invention is incorporated in the set top box 100. Alternatively, the transport stream parser can be incorporated in any other host system, such as a computer system, which is capable of receiving a data stream having a plurality of packets that have MPEG data.

In an embodiment, the set top box 100 includes an interface module 50, a MPEG decoder 40, a mass storage device 10 (e.g., a hard drive, a CD drive), a main memory 20 (e.g., a RAM), a host processor 30 (e.g., a microprocessor, a microcontroller), and a bus 60 (e.g., a PCI bus 60). It should be understood that the set top box 100 can have other configurations.

The interface module 50 has one or more ports 71 and 72 for receiving the data stream. Port 71 is coupled to a first network interface module NIM1. Port 72 is coupled to a second network interface module NIM2. A network interface module receives the data stream digitally transmitted via a satellite, a cable, or a terrestrial transmitter. The data stream has packets which have data (e.g., video, audio, etc.) for one or more programs. In an embodiment, the interface module 50 includes a descrambler for descrambling the data stream which has been scrambled prior to being digitally transmitted, a router for routing the data stream to a location within the set top box 100 or to an external location 80 (e.g., a IEEE 1394 device, a Home Network, etc.), a demultiplexer for demultiplexing the data stream, a transport stream parser for parsing the data stream as will be discussed below, a local cipher/decipher to encrypt the data stream prior to transmitting the data stream on a data bus (e.g., PCI bus 60) or to another location, and a DMA for accessing the main memory 20 to store the data stream prior to transmitting the data stream to the mass storage device 10. It should be understood that the interface module 50 can have other configurations.

In an embodiment, the MPEG decoder 40 can receive the data stream from the interface module 50 via connection 90 or from the PCI bus 60. The MPEG decoder 40 can include a local decipher to decrypt the received data stream.

The need to encrypt the video and audio data of a data stream before transferring the data stream through a bus (e.g., PCI bus 60) and placing the data stream in the mass storage device 10 creates a demand for the transport stream parser of the present invention. In particular, the transport stream parser relieves the host processor 30 from performing tedious tasks (e.g., decrypting and scanning) to support a Trick Mode operation by the MPEG decoder 40. As described above, during Trick Mode operation (e.g., fast forward, fast reverse, etc.), only packets having particular MPEG video frames are sent to a MPEG decoder 40. In addition, the transport stream parser makes Trick Mode operation possible without compromising the data security of the set top box 100. For example, if the packets of the data stream are encrypted before the packets are transferred to the main memory 20 and then to the mass storage device 10, the host processor 30 may not be able to scan the packets since the packets are already encrypted before the host processor 30 accesses the packets and since the host processor 30 may be unable to decrypt the packets.

Figure 9:
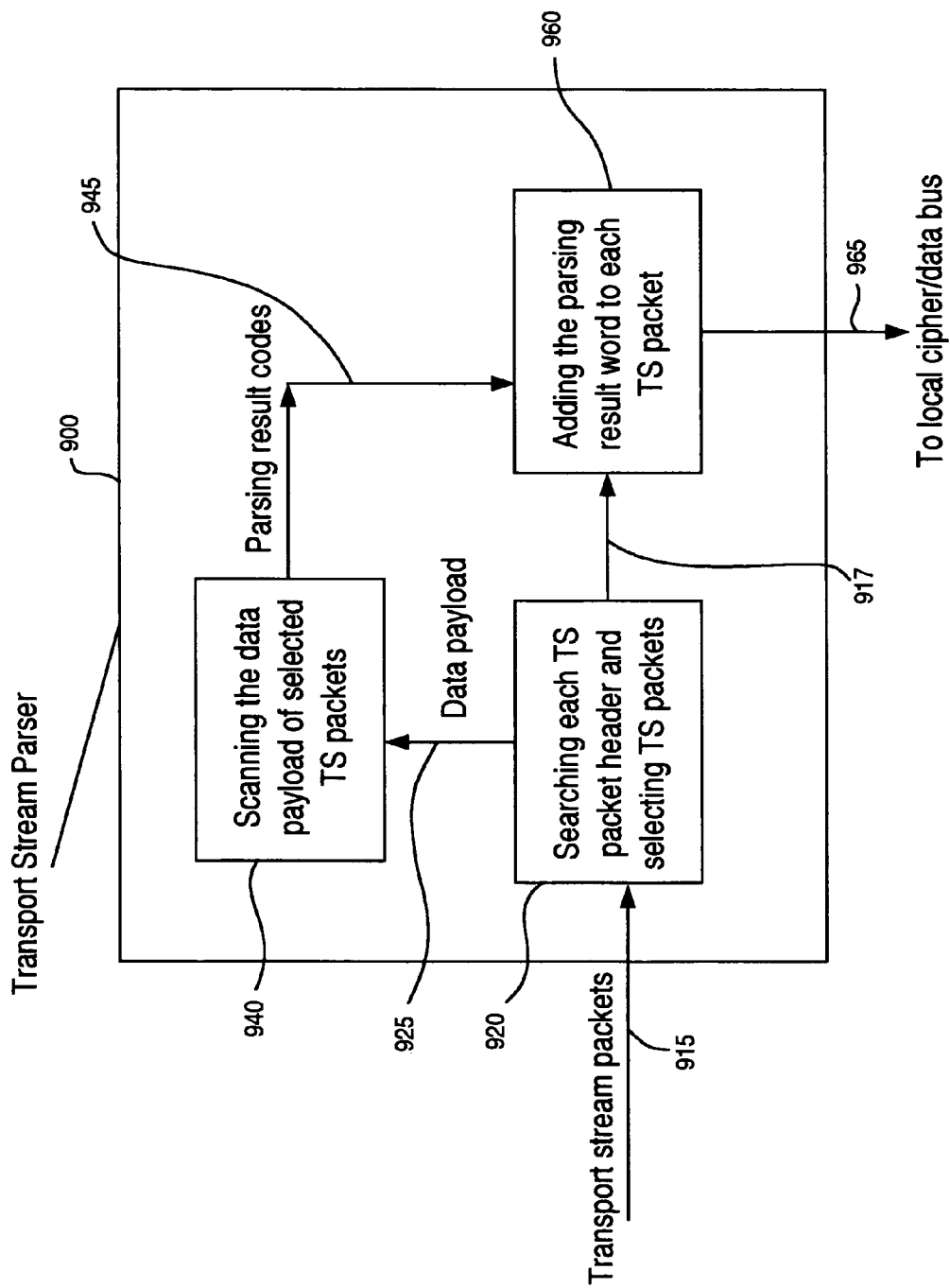
FIG. 9 illustrates a block diagram of a transport stream parser in accordance with an embodiment of the present invention.

In an embodiment, the transport stream parser processes "on-the-fly" the data stream having a plurality of packets that have MPEG data. The data stream can be a transport stream compliant with a Digital Video Broadcast (DVB) standard (e.g., ITU-T H.220.0/ISO 13818-1 Generic Coding Of Moving Pictures And Associated Information: Systems, ISO 13818-2 Generic Coding Of Moving Pictures And Associated Information: Video), a transport stream compliant with a Digital Satellite System (DSS) broadcast standard (e.g., DIRECTV Transport Protocol Specification For The Integrated Receiver/Decoder (IRD)), or any other type of transport stream. FIG. 9 illustrates a transport stream parser 900 in accordance with an embodiment of the present invention.

In an embodiment, after the transport stream is processed within the interface module 50 (e.g., by the descrambler, router, demultiplexer, etc.), the transport stream is directed to the transport stream parser (within the interface module 50). The transport stream parser selects TS (transport stream) packets from the transport stream by Searching for a first plurality of codes in a first portion of each TS packet. The set top box 100 programs the transport stream parser with criteria for selecting TS packets from the transport stream, whereas the criteria for selecting TS packets from a DVB transport stream is different from the criteria for selecting TS packets from a DSS transport stream. Moreover, the transport stream parser scans the selected TS packets for a second plurality of codes (or unique bit patterns) to determine a plurality of parsing result codes. The second plurality of codes identify the start of a video PES (packetized elementary stream) and identify the start of a MPEG video frame. In addition, the transport stream parser adds a parsing result word having the parsing result codes to each TS packet. In an embodiment, the parsing result word is 32 bits long. The transport stream parser can process the TS packets before the TS packets are input into the local cipher (within the interface module 50) and routed to the main memory 20.

As the TS packets are routed to the mass storage device 10 from the main memory 20 or another location, the parsing result word in each TS packet is identified and used by the host processor 30 (which executes host software) to generate an index table. The index table indicates to the host processor 30 the TS packets in which the start of a video PES is located and indicates to the host processor the TS packets in which the start of a MPEG video frame is located. Hence, during Trick Mode operation (e.g. fast forward, fast reverse, etc.), the host processor 30 is able to send to the MPEG decoder 40 the particular TS packets having particular MPEG video frames (e.g., I-Frames) rather than sending both unnecessary and necessary TS packets which can overwhelm the MPEG decoder 40 attempting to perform a Trick Mode operation.

Figure 2A:
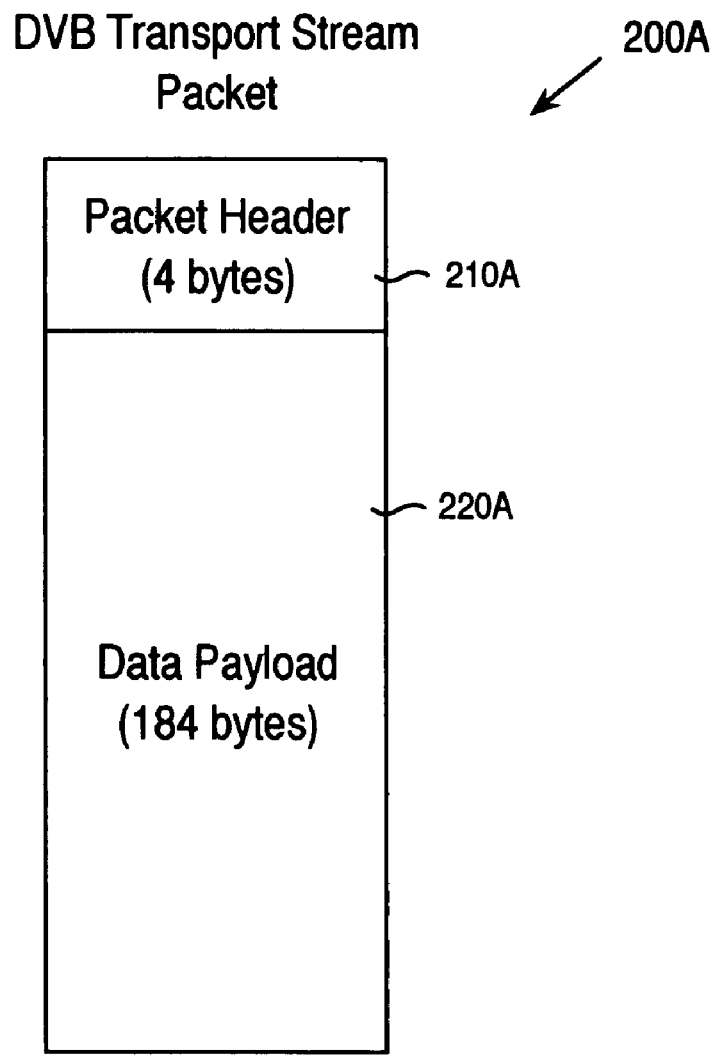
FIG. 2A illustrates a DVB transport stream packet before being processed by transport stream parser of the present invention.

FIG. 2A illustrates a DVB transport stream packet 200A before being processed by a transport stream parser of the present invention. The DVB TS (transport stream) packet 200A includes a packet header 210A and a data payload 220A, whereas the packet header 210A is 4 bytes long and the data payload 220A is 184 bytes long. Miscellaneous data (e.g., a routing control word, a time stamp, etc.) can precede the packet header 210A. Moreover, miscellaneous data (e.g., a user defined word) can follow the data payload 220A. The data payload 220A is encrypted by the local cipher (of the interface module 50). It should be understood that the DVB transport stream packet 200A can have other configurations.

Figure 2B:
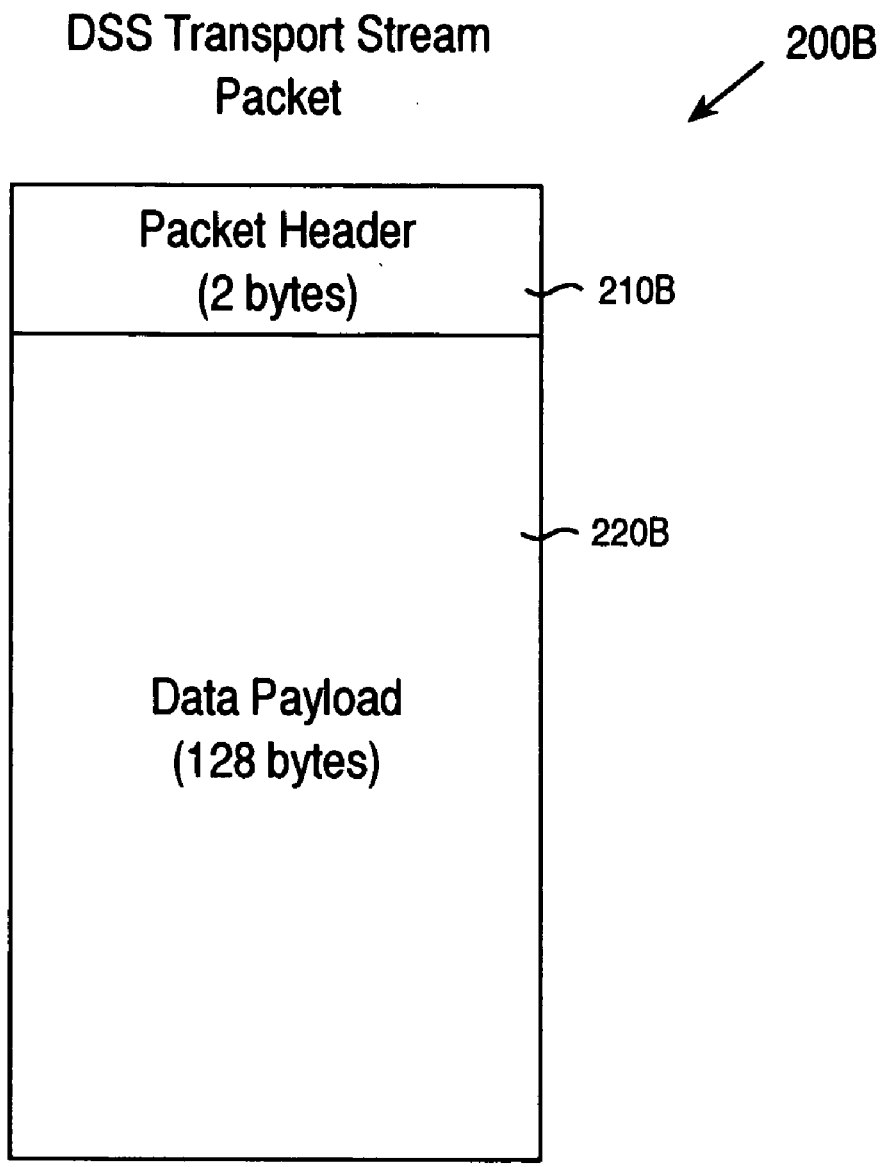
FIG. 2B illustrates a DSS transport stream packet before being processed by transport stream parser of the present invention.

FIG. 2B illustrates a DSS transport stream packet 200B before being processed by a transport stream parser of the present invention. The DSS TS packet 200B includes a packet header 210B and a data payload 220B, whereas the packet header 210B is 2 bytes long and the data payload 220A is 128 bytes long. Miscellaneous data (e.g., a routing control word, a time stamp, etc.) can precede the packet header 210B. Moreover, miscellaneous data (e.g., a user defined word) can follow the data payload 220B. The data payload 220B is encrypted by the local cipher (of the interface module 50). It should be understood that the DSS transport stream packet 200B can have other configurations.

Figure 3A:
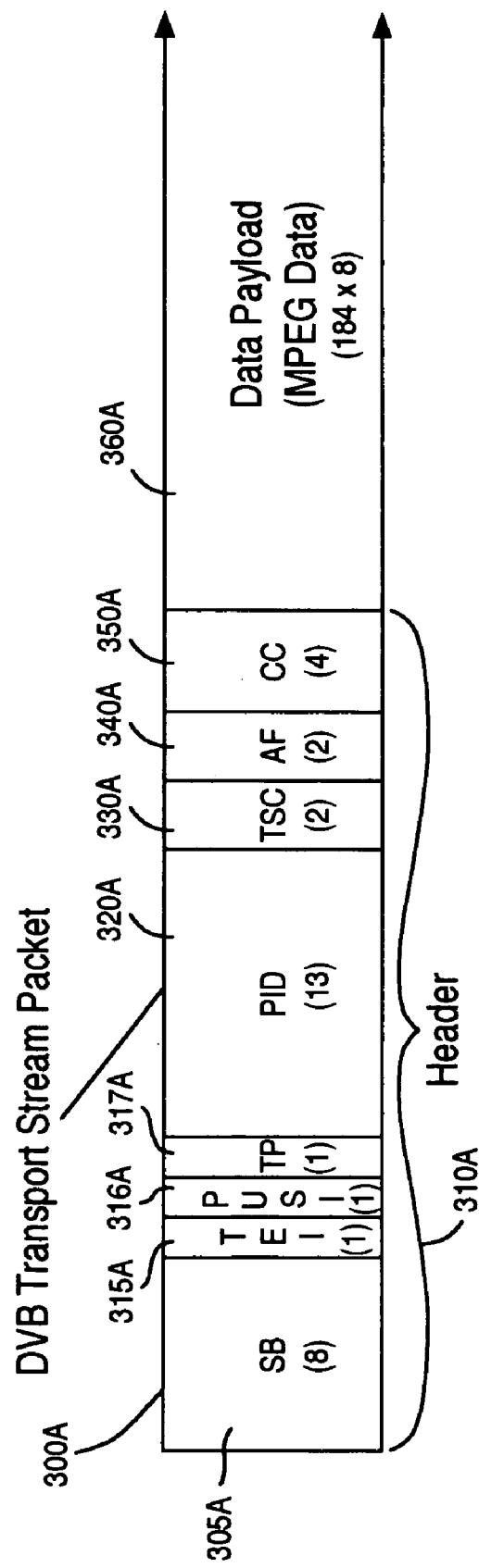
FIG. 3A illustrates a DVB transport stream packet without an Adaptation Field.

FIG. 3A illustrates a DVB transport stream packet 300A without an Adaptation Field. The packet header 310A includes a plurality of fields 305A–350A. Each field 305A–350A has a particular code. The particular codes include a sync_byte (SB) 305A which is 8 bits long, a transport_error_indicator (TEI) 315A which is 1 bit long, a payload_unit_start_indicator (PUSI) 316A which is 1 bit long, a transport_priority (TP) 317A which is 1 bit long, a packet_identification (PID) 320A which is 13 bits long, a transport_scrambling_control (TSC) 330A which is 2 bits long, an adaptation_field_control (AF) 340A which is 2 bits long, and a continuity_counter (CC) 350A which is 4 bits long. Moreover, the data payload 360A is 184 bytes long. The data payload 360A can have MPEG data formatted into PES packets.

The transport stream can include data for one or more programs, whereas each DVB TS packet carrying MPEG data in the transport stream is usually associated with a particular program. The PID 320A in the packet header 310A indicates the program with which the DVB TS packet is associated. A program usually contains packets with different PID values.

Figure 3B:
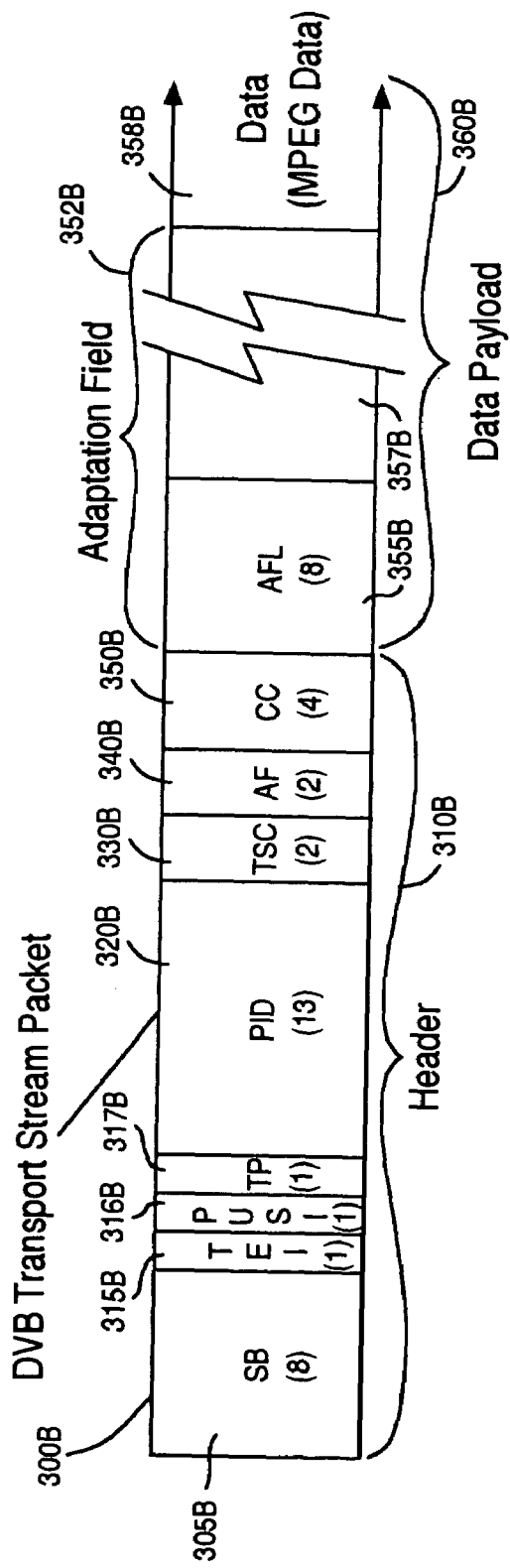
FIG. 3B illustrates a DVB transport stream packet having an Adaptation Field.

FIG. 3B illustrates a DVB transport stream packet 300B having an Adaptation Field 352B. The packet header 310B includes a plurality of fields 305B–350B. Each field 305B–350B has a particular code. The particular codes include a sync_byte (SB) 305B which is 8 bits long, a transport_error_indicator (TEI) 315B which is 1 bit long, a payload_unit_start_indicator (PUSI) 316B which is 1 bit long, a transport priority (TP) 317B which is 1 bit long, a packet_identification (PID) 320B which is 13 bits long, a transport scrambling control (TSC) 330B which is 2 bits long, a adaptation_field_control (AF) 340B which is 2 bits long, and a continuity_counter (CC) 350B which is 4 bits long. Moreover, the data payload 360B is 184 bytes long. Here, the data payload 360B includes an adaptation field 352B and a data field 358B. The adaptation field 352B includes an adaptation_field_length (AFL) code 355B which is 8 bits long and a stuffing field 357B which has a length specified by the AFL code 355B. The data field 358B can have MPEG data formatted into PES packets.

For DVB TS packets carrying PES packets, stuffing is needed when there is insufficient PES packet data to completely fill the 184 bytes of a data payload of the DVB TS packet. Stuffing is accomplished by defining an adaptation field 352B so that the bytes of the data payload remaining after the adaptation field 352B exactly accommodate the available PES packet data. The adaptation field 352B is filled with stuffing bytes.

FIG. 3C illustrates a table 300C showing the Adaptation Field Control (AF) values. In particular, if the AF has a value of 01 (which is the case in FIG. 3A) the data payload 360A of the DVB TS packet 300A does not have an adaptation field and has only data such as MPEG data formatted into PES packets. Moreover, if the AF has a value of 11 (which is the case in FIG. 3B) the data payload 360B of the DVB TS packet 300B has an adaptation field 352B followed by data such as MPEG data formatted into PES packets.

Referring to FIGS. 3A–3C, the transport stream parser of the present invention receives the transport stream and selects DVB TS packets from the transport stream by searching in the fields of the packet header of the DVB TS packets for a first plurality of codes. In particular, the first plurality of codes includes the AF having values 01 or 11 and the PID having a value that matches a programmed PID, whereas the set top box 100 (FIG. 1) programs the transport stream parser with the programmed PID for selecting particular DVB TS packets. More importantly, the transport stream parser allows the miscellaneous data preceding the packet header to pass through without being scanned. Continuing, the transport stream parser scans the data payload of the selected DVB TS packets for a second plurality of codes. If the selected DVB TS packet has an AF with the value 11 (indicating the presence of an adaptation field), the transport stream parser allows the adaptation field to pass through without being scanned for the second plurality of codes.

Figure 4A:
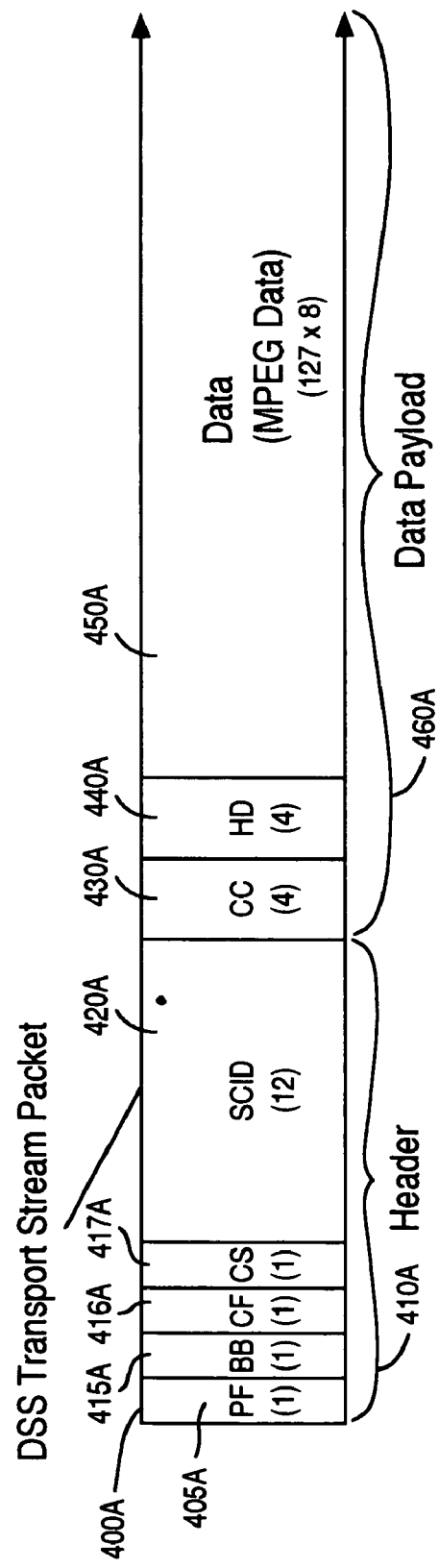
FIG. 4A illustrates a DSS transport stream packet without non-MPEG data/redundant data.

FIG. 4A illustrates a DSS transport stream packet 400A without non-MPEG data/redundant data. The packet header 410A includes a plurality of fields 405A–420A. Each field 405A–420A has a particular code. The particular codes include a Packet Framing (PF) 405A which is 1 bit long, a Bundle Boundary (BB) 415A which is 1 bit long, a Control Flag (CF) 416A which is 1 bit long, a Control Sync (CS) 417A which is 1 bit long, and a Service Channel Identification (SCID) 420A which is 12 bits long. Moreover, the data payload 460A is 128 bytes long. The data payload 460A includes a Continuity Counter (CC) 430A which is 4 bits long, a Header Designator (HD) 440A which is 4 bits long, and a data field 450A which can have MPEG data formatted into PES packets.

The transport stream can include data for one or more programs, whereas each DSS TS packet in the transport stream is associated with a particular program. The SCID 420A in the packet header 410A indicates the program with which the DSS TS packet is associated. A program usually contains packets with different SCID values.

Figure 4B:
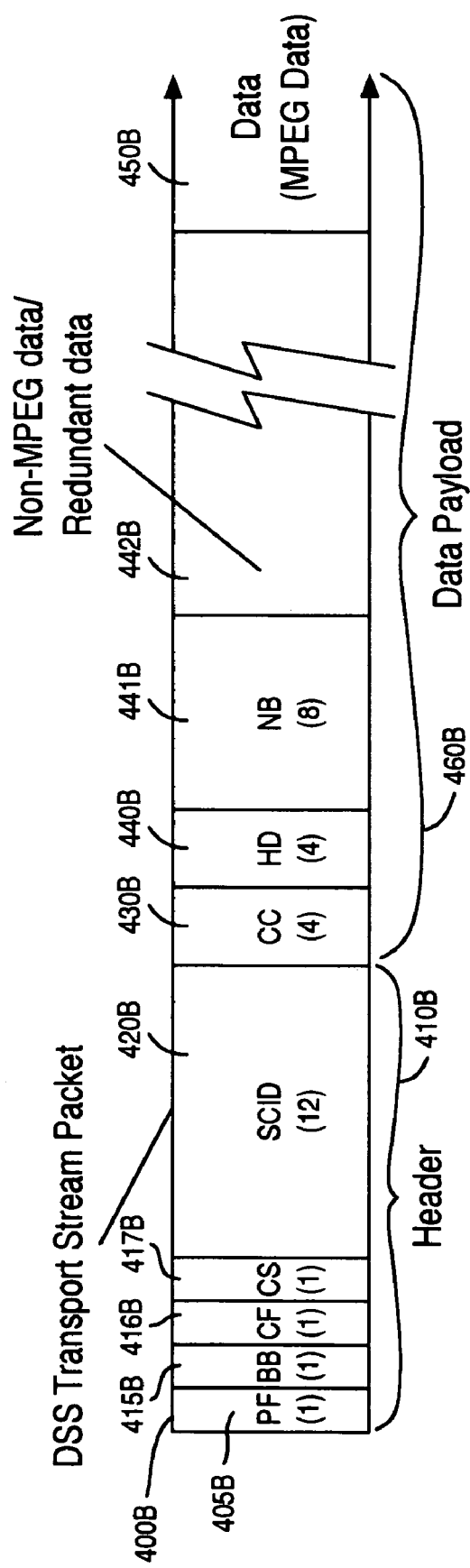
FIG. 4B illustrates a DVB transport stream packet having non-MPEG data/redundant data.

FIG. 4B illustrates a DVB transport stream packet 400B having non-MPEG data/redundant data. The packet header 410B includes a plurality of fields 405B–420B. Each field 405B–420B has a particular code. The particular codes include a Packet Framing (PF) 405B which is 1 bit long, a Bundle Boundary (BB) 415B which is 1 bit long, a Control Flag (CF) 416B which is 1 bit long, a Control Sync (CS) 417B which is 1 bit long, and a Service Channel Identification (SCID) 420B which is 12 bits long. Moreover, the data payload 460B is 128 bytes long. Here, the data payload 460B includes a Continuity Counter (CC) 430B which is 4 bits long, a Header Designator (HD) 440B which is 4 bits long, a Number of Bytes (NB) 441B which is 8 bits long, a non-MPEG data/redundant data field 442B which has a length specified by the NB 441B, and a data field 450B which can have MPEG data formatted into PES packets.

FIG. 4C illustrates a table 400C showing the Header Designator (HD) values. In particular, if the HD has a value of 01x0 (which is the case in FIG. 4A) the data payload 460A of the DSS TS packet 400A does not have non-MPEG data/redundant data and has only MPEG video data formatted into PES packets. Moreover, if the HD has a value of 1xx0 (which is the case in FIG. 4B) the data payload 460B of the DSS TS packet 400B has non-MPEG data/redundant data 442B followed by MPEG video data formatted into PES packets.

Referring to FIGS. 4A–4C, the transport stream parser of the present invention receives the transport stream and selects DSS TS packets from the transport stream by searching in the fields of the packet header and in the first byte of the data payload of the DSS TS packets for a first plurality of codes. In particular, the first plurality of codes includes the HD having values 01x0 or 1xx0 and the SCID having a value that matches a programmed SCID, whereas the set top box 100 (FIG. 1) programs the transport stream parser with the programmed SCID for selecting particular DSS TS packets. More importantly, the transport stream parser allows the miscellaneous data preceding the packet header to pass through without being scanned. Continuing, the transport stream parser scans (starting after the HD) the data payload of the selected DSS TS packets for a second plurality of codes. If the selected DSS TS packet has an HD with the value 1xx0 (indicating the presence of non-MPEG data/redundant data), the transport stream parser allows the non-MPEG data/redundant data to pass through without being scanned for the second plurality of codes.

Figure 5:
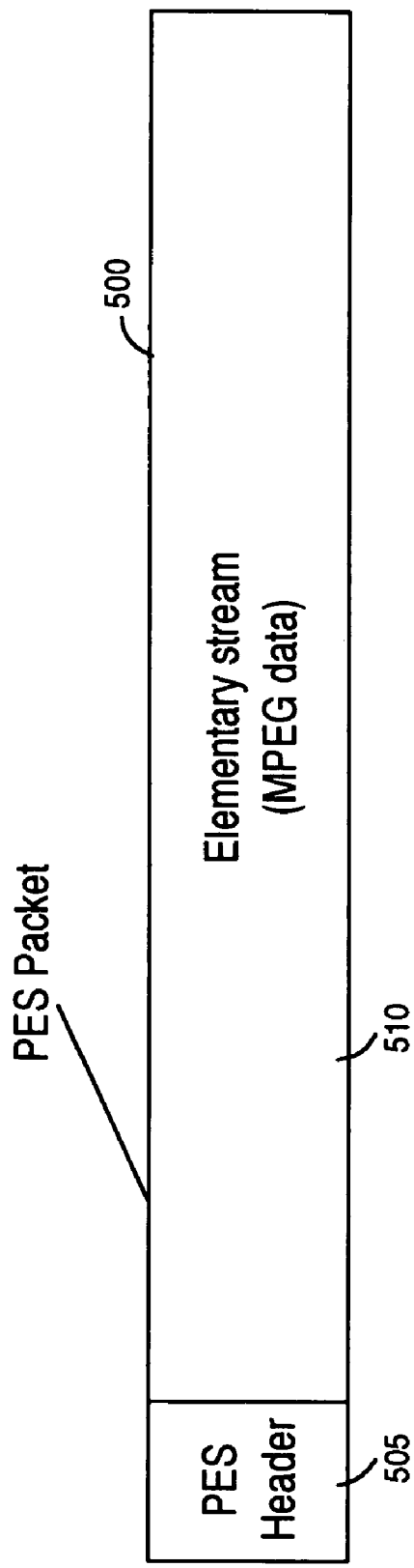
FIG. 5 illustrates a PES packet.

FIG. 5 illustrates a PES packet 500. MPEG data is formatted into a plurality of PES packets 500. A PES packet 500 can have MPEG video data, audio data, or auxiliary data material. In the transport stream, TS packets having audio PES packets are multiplexed with TS packets having video PES packets and TS packets having auxiliary PES packets. Moreover, the TS packets of one program can be multiplexed with the TS packets of one or more programs. The PES packet 500 is partitioned into data blocks to fit in the data payload of the DVB TS packet 220 (FIG. 2A) or the DSS TS packet (FIG. 2B). As illustrated in FIG. 5, the PES packet 500 includes a PES packet header 505 and a PES packet elementary stream 510.

Figure 6A:
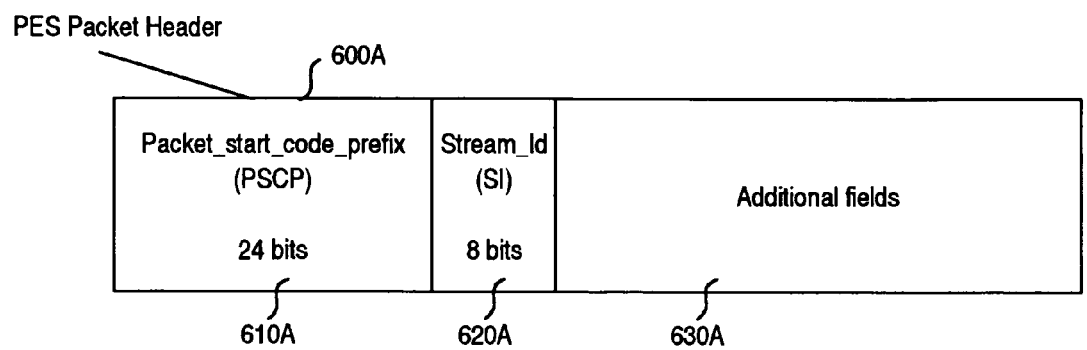
FIG. 6A illustrates a PES packet header.

FIG. 6A illustrates a PES packet header 600A. The PES packet header 600A includes a packet_start_code_prefix (PSCP) 610A which is 24 bits long, a stream_id (SI) 620A which is 8 bits long, and additional fields 630A. The PSCP 610A identifies the beginning of a PES packet and has the value 0000 0000 0000 0000 0000 0001 (or 0x000001). More importantly, the PSCP 610A can be partitioned into two TS packets when the PES packet is partitioned into data blocks to fit in the data payload_of the DVB TS packet 220 (FIG. 2A) or the DSS TS packet (FIG. 2B). For example, one TS packet may have 0000 0000 0000 0000 while another TS packet may have 0000 0001. The SI 620A specifies the type of data (e.g., MPEG video, MPEG audio, etc.) in the PES packet elementary stream 510 (FIG. 5). In particular, a video stream_id (SI) 620A having the value 1110 xxxx indicates that the PES packet is a video PES packet (i.e., the PES packet elementary stream has MPEG video data). Moreover, the SI 620A having other values may indicate the PES packet is an audio PES packet (i.e., the PES packet elementary stream has MPEG audio data) or an auxiliary PES packet (i.e., the PES packet elementary stream has MPEG auxiliary data).

Figure 6B:
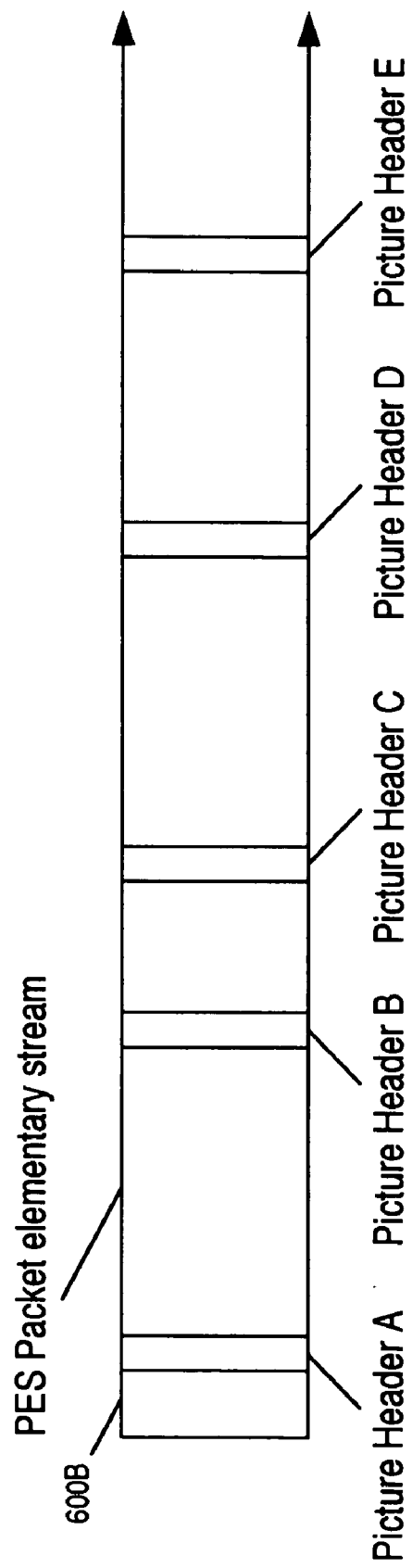
FIG. 6B illustrates a PES packet elementary stream.

FIG. 6B illustrates a video PES packet elementary stream 600B having data for multiple MPEG video frames. There are several types of MPEG video frames. An I-Frame (or Intra-coded Frame) is a frame coded using information drawn from itself. The B-Frame (or Bidirectionally predictive Frame) is a frame coded using motion-compensated prediction from previous and future reference frames. The P-Frame (or Predictive-coded Frame) is a frame coded using motion-compensated prediction from a previous reference frame. Moreover, a group of pictures is a self-contained sequence of MPEG video frames that starts with an I-Frame, followed by a variable number of B-Frames and P-Frames. As illustrated in FIG. 6B, the PES packet elementary stream 600B of a video PES packet includes a plurality of picture headers (picture header A to picture header E). A picture header indicates the start of a MPEG video frame (e.g., I-Frame, B-Frame, P-Frame).

Figure 6C:
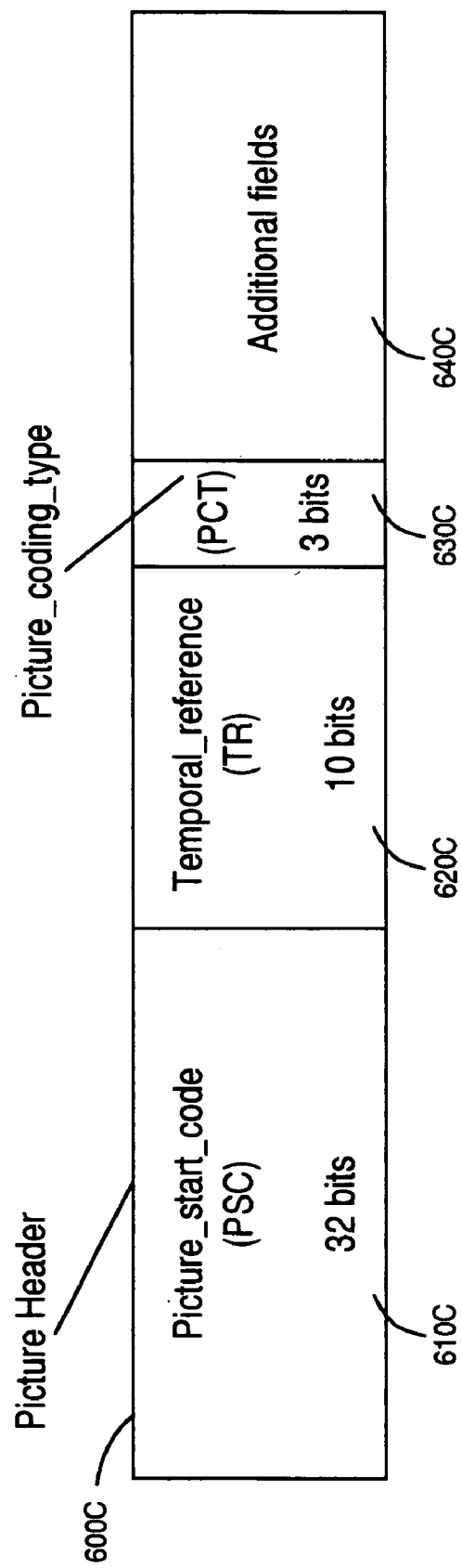
FIG. 6C illustrates a picture header.

FIG. 6C illustrates a picture header 600C. The picture header 600C includes a picture_start_code (PSC) 610C which is 32 bits long, a temporal_reference (TR) 620C which is 10 bits long, a picture_coding_type (PCT) 630C which is 3 bits long, and additional fields 640C. The PSC 610C identifies the beginning of a MPEG video tame (or picture header) and has the value 0000 0000 0000 0000 0000

0001 0000 0000 (or 0x00000100). More importantly, the PSC 610C, the TR 620C, or both can be partitioned into two TS packets when the PES packet is partitioned into data blocks to ft in the data payload of the DVB TS packet 220 (FIG. 2A) or the DSS TS packet FIG. 2B). The picture_coding_type (PCT) 630C specifies the type of MPEG video frame (e.g., I-Frame, B-Frame, P-Frame). In particular, the PCT 630C having the value 001 indicates an I-Frame. The PCT 630C having the value 010 indicates a P-Frame. The PCT 630C having the value 011 indicates a B-Frame.

Referring to FIGS. 6A–6C, the transport stream parser of the present invention scans the data payload of the selected DVB TS packets or DSS TS packets for a second plurality of codes (or unique bit patterns) to determine a plurality of parsing result codes. Specifically, the end portion of the data payload of a previously selected TS packet and the beginning portion of the data payload of the currently selected TS packet are scanned for the second plurality of codes since one or more of the second plurality of codes may be partitioned into the previously selected TS packet and the currently selected TS packet. In particular, the second plurality of codes includes the_packet_start_code_prefix (PSCP) having the value 0000 0000 0000 0000 0000 0001 (or 0x000001) and the stream_id (SI) having a value that matches a programmed SI, whereas the set top box 100 (FIG. 1) programs the transport stream parser with the programmed SI that indicates the presence of a video PES packet. If one or both of these codes are found, a first parsing result code is set to indicate that the stream_id (SI) which identifies MPEG video data is located in the selected TS packet, indicating the start of a video PES packet was found. Another parsing result code may be set to indicate whether 0, 1, 2, or 3 bytes of the packet_start_code_prefix (PSCP) (which is three bytes long) are located in a previously selected TS packet. In addition, the second plurality of codes includes the picture_start_code (PSC) having the value 0000 0000 0000 0000 0000 0001 0000 0000 (or 0x00000100). If this code is found (i.e., indicating the start of a MPEG video frame) and if the byte containing the picture_coding_type (PCT) is found (whereas the second byte after the picture_start_code (PSC) is the byte containing the picture_coding_type (PCT)), a second parsing result code is set to the value of the picture_coding_type (PCT) (e.g., I-Frame, B-Frame, P-Frame) of the selected TS packet and a third parsing result code is set to the upper 8 bits of the temporal_reference (TR) which may be in the previously selected TS packet or in the currently selected TS packet. Another parsing result code may be set to indicate whether 0, 1, 2, 3, 4, or 5 bytes of the combination of picture_start_code (PSC) and temporal_reference (TR) (whereas the combination is five bytes long) are located in a previously selected TS packet. More importantly, the transport stream parser allows the adaptation field (in the case of DVB TS packets) and the non-MPEG data/redundant data (in the case of DSS TS packets) to pass through without being scanned.

Moreover, the transport stream parser adds a parsing result word having the parsing result codes to each DVB TS packet or DSS TS packet. In an embodiment, the parsing result word is appended to end of the DVB TS packet or DSS TS packet. In the case of the DSS TS packet, the transport stream parser adds padding bytes to the end of the DSS TS packet before appending the parsing result word.

Figure 7A:
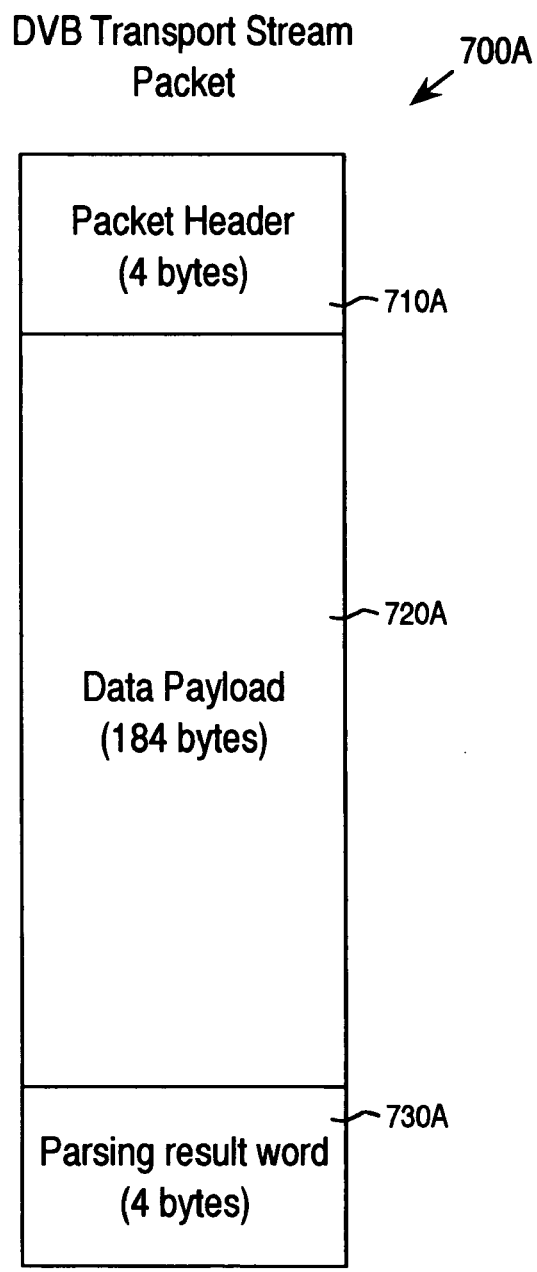
FIG. 7A illustrates a DVB transport stream packet after being processed by transport stream parser of the present invention.

FIG. 7A illustrates a DVB transport stream packet 700A after being processed by a transport stream parser of the present invention. At the output of the transport stream parser, the DVB TS packet 700A includes a packet header 710A and a data payload 720A, whereas the packet header 710A is 4 bytes long and the data payload 720A is 184 bytes long, as described above in FIG. 2A. In addition, the DVB TS packet 700A has a parsing result word 730A which is 4 bytes long. In an embodiment, the parsing result word 730A is appended to the end of the DVB TS packet 700A. Miscellaneous data (e.g., a routing control word, a time stamp, etc.) can precede the packet header 710A. Moreover, miscellaneous data (e.g., a user defined word) can follow the parsing result word 730A. In the interface module 50 of FIG. 1, the DVB transport stream packet 700A is processed by the transport stream parser. Then, the DVB transport stream packet 700A is sent to the local cipher. There, the data payload 720A is encrypted by the local cipher (of the interface module 50) before the DVB transport stream packet 700A is transmitted to the main memory 20 via the PCI bus 60. It should be understood that the DVB transport stream packet 700A can have other configurations.

Figure 7B:
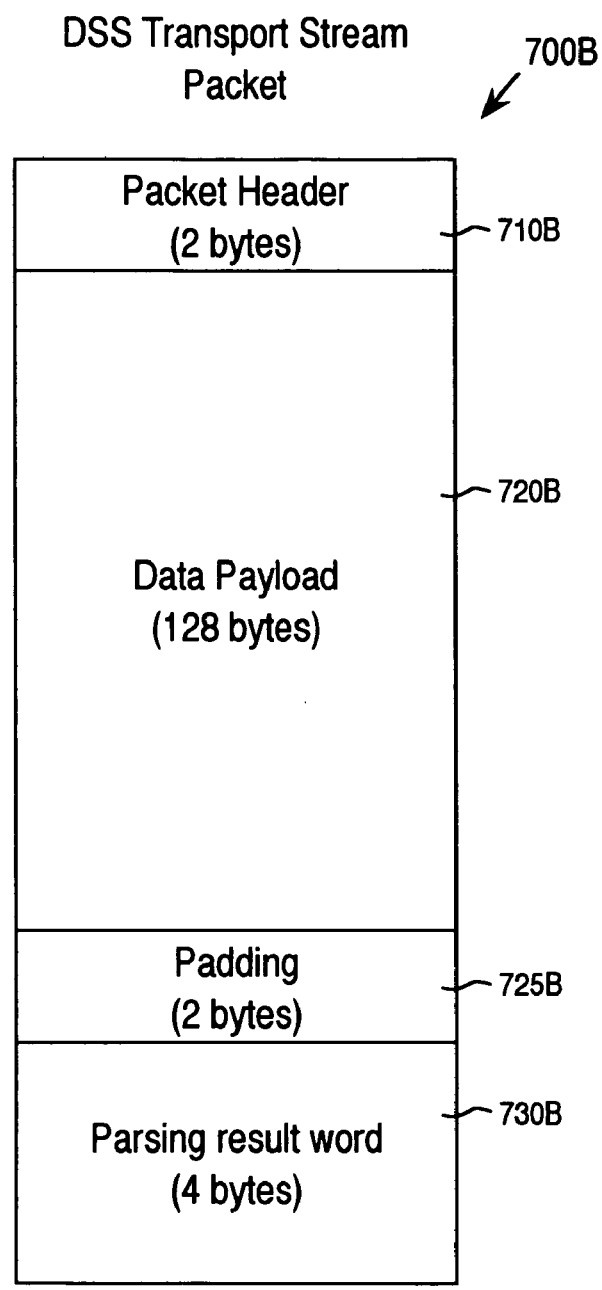
FIG. 7B illustrates a DSS transport stream packet after being processed by transport stream parser of the present invention.

FIG. 7B illustrates a DSS transport stream packet 700B after being processed by a transport stream parser of the present invention. The DSS TS packet 700B includes a packet header 710B and a data payload 720B, whereas the packet header 710B is 2 bytes long and the data payload 720A is 128 bytes long, as described above in FIG. 2B. In addition, the DSS TS packet 700B has two bytes of padding bytes 725B and a parsing result word 730B which is 4 bytes long. The padding bytes 725B are appended to the end of the DSS TS packet 700B before appending the parsing result word 730B. The padding bytes 725B are added to the DSS TS packet 700B so the resulting length is an integral number of 32-bit words, whereas the PCI bus 60 (FIG. 1) is able to process 32 bits per clock cycle. In an embodiment, the parsing result word 730B is appended to the end of the DSS TS packet 700A. Miscellaneous data (e.g., a routing control word, a time stamp, etc.) can precede the parsing result word 730B. In the interface module 50 of FIG. 1, the DSS transport stream packet 700B is processed by the transport stream parser. Then, the DSS transport stream packet 700B is sent to the local cipher. There, the data payload 720B is encrypted by the local cipher (of the interface module 50) before the DSS transport stream packet 700B is transmitted to the main memory 20 via the PCI bus 60. It should be understood that the DSS transport stream packet 700B can have other configurations.

Figure 8:
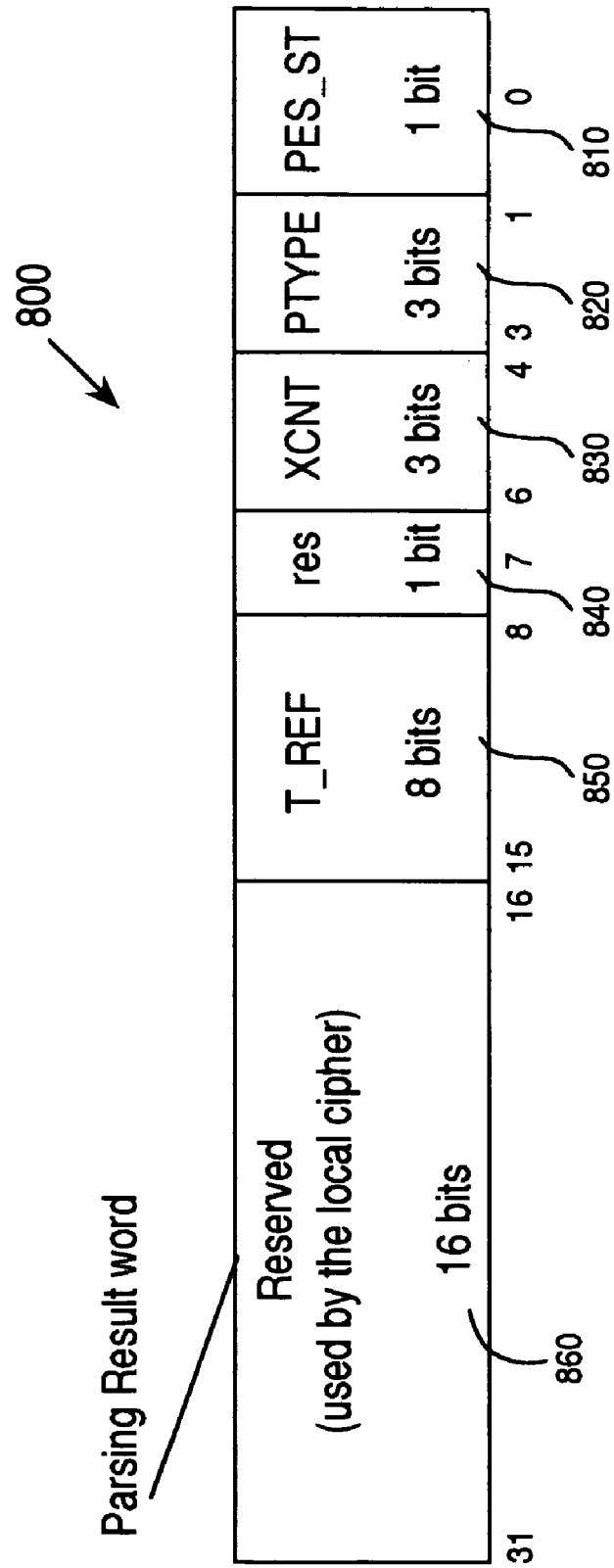
FIG. 8 illustrates a parsing result word in accordance with an embodiment of the present invention.

FIG. 8 illustrates a parsing result word 800 in accordance with an embodiment of the present invention. In an embodiment, the parsing result word 800 is 32 bits long. The parsing result word 800 includes a plurality of parsing result codes which are determined by scanning the data payload of the selected TS packets. The parsing result codes include a PES_ST code 810 which is 1 bit long, a PTYPE code 820 which is 3 bits long, a XCNT code 830 which is 3 bits long, and a T_REF code 850 which is 8 bits long. The PES_ST code 810 is set to 1 to indicate a video stream_id (SI) 620A (FIG. 6A) identifying the beginning of a video PES packet is located in the selected TS packet, otherwise the PES_ST code 810 is set to 0.

The PTYPE code 820 indicates whether the byte containing the picture coding_type (PCT) 630C (FIG. 6C) is located in the selected TS packet (i.e., indicating the start of a MPEG video frame such as a I-Frame, a B-Frame, a P-Frame). If the byte containing the picture coding_type (PCT) 630C (FIG. 6C) is located in the selected TS packet, the PTYPE code 820 is set to the value of the picture_coding_type (PCT) 630C (FIG. 6C), whereas the second byte after the picture_start_code (PSC) 610C (FIG. 6C) is the byte containing the picture_coding_type (PCT) 630C (FIG. 6C). The PTYPE code 820 is encoded as follows: the value 000 indicates the picture_coding_type (PCT) 630C (FIG. 6C) is not located in the selected TS packet, the value 001 indicates the start of a I-Frame, the value 010 indicates the start of a P-Frame, and the value 011 indicates the start of a B-Frame.

A selected TS packet can have either code identifying the start of a video PES packet or code identifying the start of a MPEG video frame.

If the bytes of the packet_start_code_prefix (PSCP) 610A (FIG. 6A) are located in a previously selected TS packet as well as in the currently selected TS packet (i.e., indicating start of a video PES packet), the XCNT code 830 indicates the number of bytes of the packet_start_code_prefix (PSCP) 610A (FIG. 6A) that are located in the previously selected TS packet. As described above, the packet_start_code_prefix (PSCP) 610A (FIG. 6A) has the value 0000 0000 0000 0000 0000 0001 (or 0x000001). The XCNT code 830 is set to 0 if all the bytes of the packet_start_code_prefix (PSCP) 610A (FIG. 6A) are located in the currently selected TS packet. The XCNT code 830 is set to 1 if one byte (i.e., 0000 0000) of the packet_start_code_prefix (PSCP) 610A (FIG. 6A) is located in the previously selected TS packet. The XCNT code 830 is set to 2 if two bytes (i.e., 0000 0000 0000 0000) of the packet_start_code_prefix (PSCP) 610A (FIG. 6A) are located in the previously selected TS packet. The XCNT code 830 is set to 3 if three bytes (i.e., 0000 0000 0000 0000 0000 0001) of the packet_start_code_prefix (PSCP) 610A (FIG. 6A) are located in the previously selected TS packet.

If the bytes of the combination of picture_start_code (PSC) 610C (FIG. 6C) and temporal_reference (TR) 620C (FIG. 6C) are located in a previously selected TS packet as well as in the currently selected TS packet (i.e., indicating the start of a MPEG video frame), the XCNT code 830 indicates the number of bytes of the combination of picture_start_code (PSC) 610C (FIG. 6C) and temporal_reference (TR) 620C (FIG. 6C) that are located in the previously selected TS packet. The XCNT code 830 is set to 0 if all the bytes of the combination of picture_start_code (PSC) 610C (FIG. 6C) and temporal_reference (TR) 620C (FIG. 6C) are located in the currently selected TS packet. The XCNT code 830 is set to 1 if the one byte of the combination of picture_start_code (PSC) 610C (FIG. 6C) and temporal_reference (TR) 620C (FIG. 6C) is located in the previously selected TS packet. The XCNT code 830 is set to 2 if two bytes of the combination of picture_start_code (PSC) 610C (FIG. 6C) and temporal_reference (TR) 620C (FIG. 6C) are located in the deviously selected TS packet. The XCNT code 830 is set to 3 if three bytes of the combination of picture_start_code (PSC) 610C (FIG. 6C) and temporal_reference (TR) 620C (FIG. 6C) are located in the previously selected TS packet. The XCNT code 830 is set to 4 if four bytes of the combination of picture_start_code (PSC) 610C (FIG. 6C) and temporal_reference (TR) 620C (FIG. 6C) are located in the previously selected TS packet. The XCNT code 830 is set to 5 if five bytes of the combination of picture_start_code (PSC) 610C (FIG. 6C) and temporal_reference (TR) 620C (FIG. 6C) are located in the previously selected TS packet.

The T_REF code 850 is set to the value of the upper 8 bits of the temporal_reference (TR) 620C (FIG. 6C) in the picture header 600C (FIG. 6C). Moreover, the T_REF code 850 is set when the byte containing the picture_coding_type (PCT) 630C (FIG. 6C) is located in the currently selected TS packet. The T_REF code 850 in the parsing result word 800 provides easy access to the upper 8 bits of the temporal_reference (TR) 620 (FIG. 6C). This especially useful when the XCNT code 830 is equal to 5 since in this case the upper 8 bits of the temporal_reference (TR) 620 (FIG. 6C) are located in the previously selected TS packet.

Moreover, the parsing result word 800 includes a reserved bit 840 which is set to 0, and a field 860 which is 16 bits long. The bits of the field 860 are set to 0 by the transport stream parser. In an embodiment of the present invention, the field 860 is used by the local cipher (in the interface module 50 of FIG. 1) to store an index value identifying the Pseudo Random number used to generate the current cipher Control Word. However, in other embodiments, the field 860 can be used by any other functional module following the transport stream parser. In practice, the bits of the parsing result word 800 are initially set to 0 before each TS packet is scanned by the transport stream parser.

The transport stream parser appends a parsing result word 800 to each TS packet. Hence, the transport stream parser appends a parsing result word 800, having the bits set to the value 0, to the TS packets that are not selected for scanning for the second plurality of codes in the data payload. The parsing result word 800 has sufficient data to enable the host processor 30 (FIG. 1) and the MPEG decoder 40 to support Trick Mode operations even if the host processor 30 is unable to decrypt the transport stream. Since the parsing result word 800 appended to each TS packet indicates the start of the video PES packets and the start of the MPEG video frames, the host processor 30 can select the necessary TS packets from the transport stream to send to the MPEG decoder 40 performing a Trick Mode operation.

FIG. 9 illustrates a block diagram of a transport stream parser 900 in accordance with an embodiment of the present invention. After the transport stream is processed within the interface module 50 (e.g., by the descrambler, router, demultiplexer, etc.) of FIG. 1, the transport stream is directed to the transport stream parser 900 within the interface module 50. The transport stream parser 900 receives the TS packets (DVB TS packets or DSS TS packets) via the connection 915. The function block 920 is configured to select TS packets from the transport stream by searching for a first plurality of codes in a first portion of each TS packet, as described above. From the function block 920, the TS packets are sent to the function block 960 via connection 917. Moreover, the function block 940 is configured to read the data payload of the selected TS packets via connection 925 and is configured to scan the data payload of the selected TS packets for a second plurality of codes (or unique bit patterns) to determine a plurality of parsing result codes, as described above. The second plurality of codes identify the start of a video PES (packetized elementary stream) and identify the start of a MPEG video frame. In addition, the function block 960 is configured to add a parsing result word having the parsing result codes to each TS packet as described above, whereas the parsing result codes are received from the function block 940 via connection 945. In an embodiment, the parsing result word is 32 bits long. From function block 960, the TS packets are sent to the local cipher via connection 965. In an embodiment, circuits are utilized to implement the function blocks 920, 940, and 960. It should be understood that the transport stream parser 900 can have other configurations.

Figure 10:
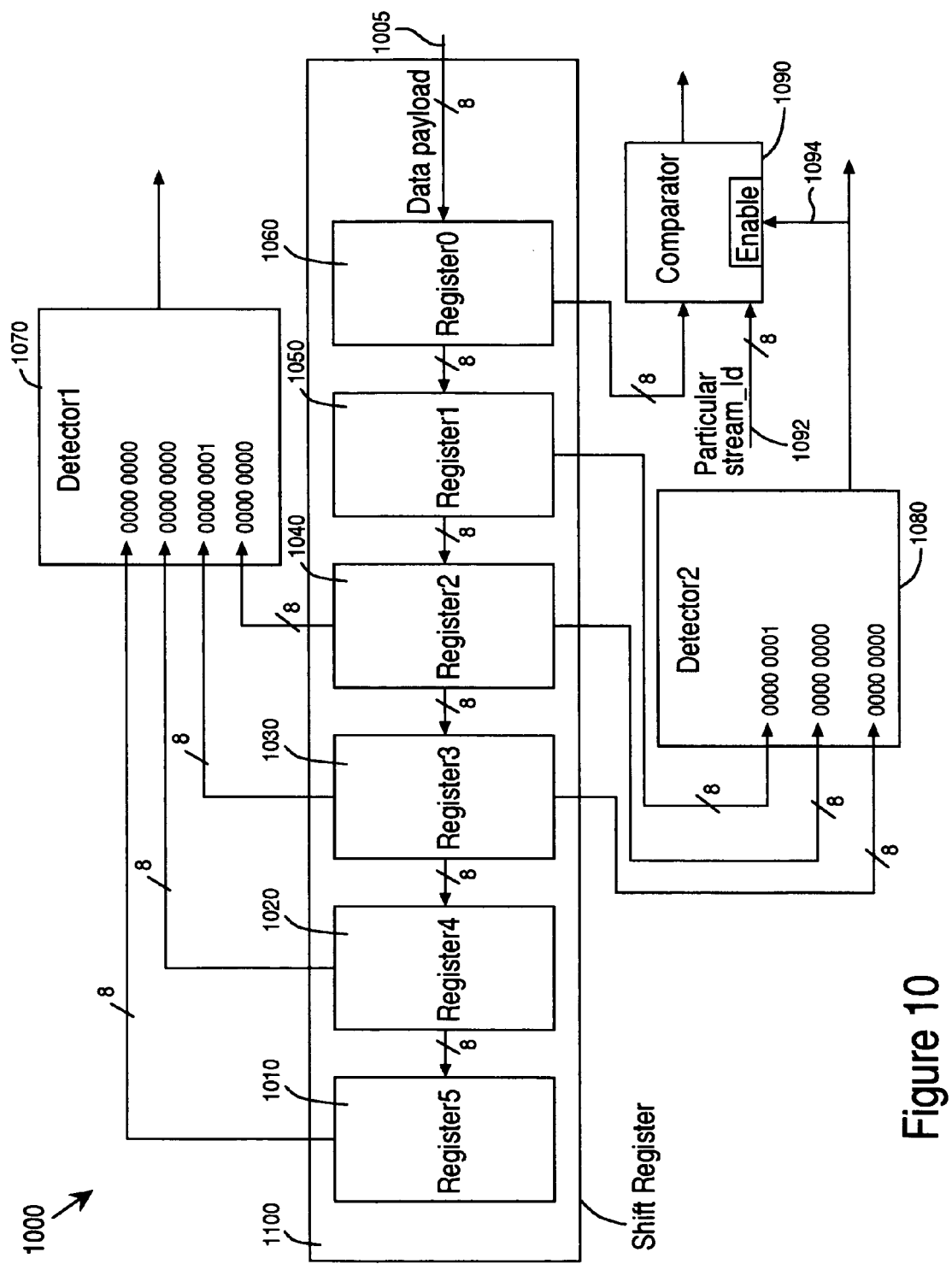
FIG. 10 illustrates a block diagram of a scanning circuit for a transport stream parser in accordance with an embodiment of the present invention.

FIG. 10 illustrates a block diagram of a scanning circuit 1000 for a transport stream parser 900 of FIG. 9 in accordance with an embodiment of the present invention. The scanning circuit 1000 is one implementation for the function block 940 of FIG. 9. In an embodiment, the scanning circuit 1000 includes a shift register 1100, a detector1 1070 coupled to the shift register 1100, a detector2 coupled to the shift register 1100, and a comparator 1090 coupled to the shift register 1100. Multiple scanning circuits 1000 are needed if the transport stream parser must process TS packets for more than one program. It should be understood that the scanning circuit 1000 can have other configurations. The operation of the scanning circuit will be described in detail in FIG. 11.

The shift register 1100 includes six registers 1010–1060 coupled in series, whereas each register 1010–1060 stores a byte and shifts left one byte at a time. A byte of the data payload of the selected TS packet is read and inputted into the shift register 1100 via connection 1005. Moreover, shifting is enabled when the data payload of selected TS packets is available at connection 1005. In addition, shifting is not enabled when the adaptation field or non-MPEG data or redundant data of the data payload is at connection 1005.

The detectors 1070 detects the unique bit pattern 0000 0000 0000 0000 0000 0001 0000 0000 in register5 1010 through register2 1040, whereas this unique bit pattern is the value of the picture_start_code (PSC) (i.e., indicating the start of a MPEG video frame). The detector2 1080 detects the unique bit pattern 0000 0000 0000 0000 0000 0001 in register3 1030 through register1 1050, whereas this unique bit pattern is the value of the packet_start_code_prefix (PSCP) (i.e., indicating the start of a PES packet).

The comparator 1090 compares the byte of the registers 1060 with a byte representing a particular programmed stream_id (SI) received via connection 1092, whereas the particular programmed stream_id (SI) is associated with a video PES packet of a particular program. In an embodiment, the comparator 1090 is enabled by the output 1094 from the detector2 1080 if the detector2 1080 detects the unique bit pattern 0000 0000 0000 0000 0000 0001 in register3 1030 through register1 1050.

FIG. 11 illustrates a flow chart diagram showing a method of processing a transport stream in accordance with an embodiment of the present invention. Reference is made to FIGS. 1–10, 12, 13A, and 13B.

Figure 11A:
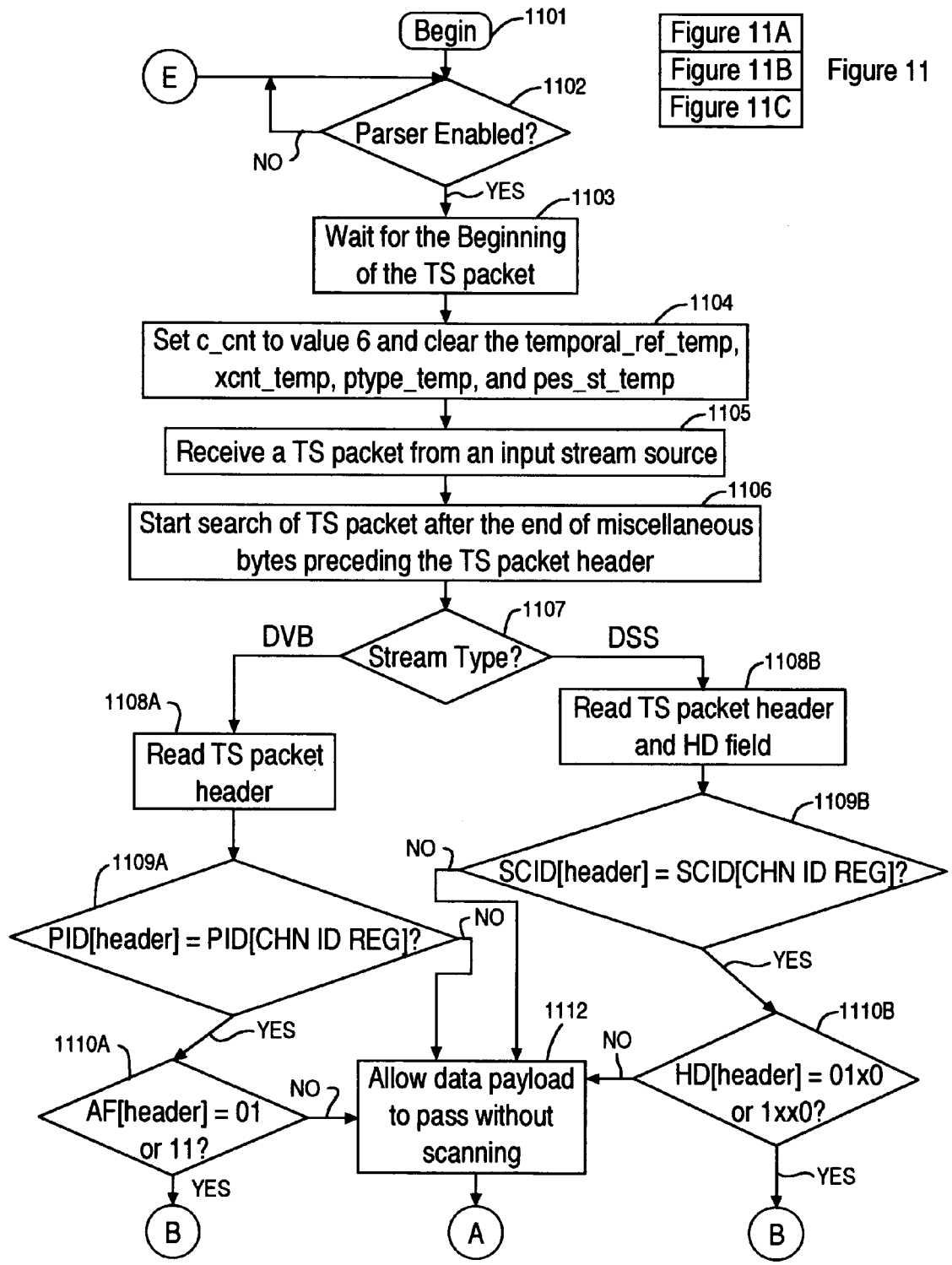
FIG. 11 illustrates a flow chart diagram showing a method of processing a transport stream in accordance with an embodiment of the present invention.
Figure 13A:
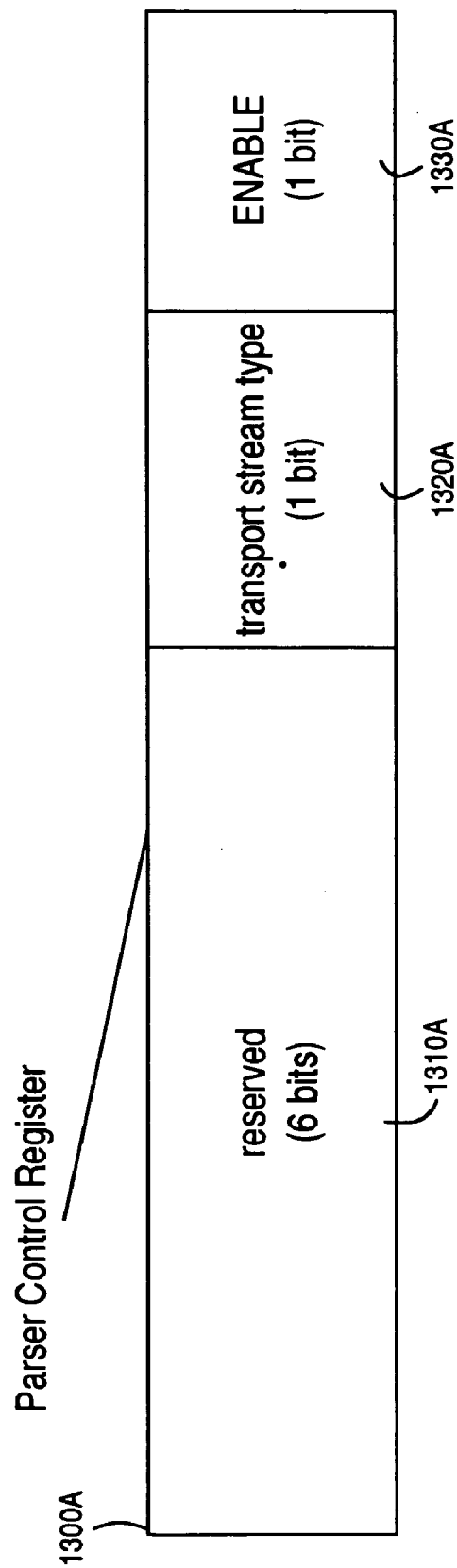
FIG. 13A illustrates a parser control register in accordance with an embodiment of the present invention.

In FIG. 11A, the method of processing a transport stream begins at step 1101 following a hardware reset. At step 1102, the transport stream parser 900 is waiting for the host system (e.g., a set top box 100) to enable the transport stream parser by setting a bit in the parser control register. While in the disabled state, the transport stream parser 900 sets to 1 the bits in the shift register 1100 (FIG. 10) and clears all internal flags. FIG. 13A illustrates a parser control register 1300A in accordance with an embodiment of the present invention. In particular, the parser control register 1300A is used to enable the transport stream parser 900 and to select the operational mode of the transport stream parser 900. The parser control register 1300A includes an Enable bit 1330A which is set to 1 to enable the transport stream parser 900, a transport stream type bit 1320A which is set to 0 to configure the transport stream parser 900 to process DVB TS packets and which is set to 1 to configure the transport stream parser 900 to process DSS TS packets, and a reserved field 1310A which is 6 bits long. It should be understood that the parser control register 1300A can have other configurations.

Figure 13B:
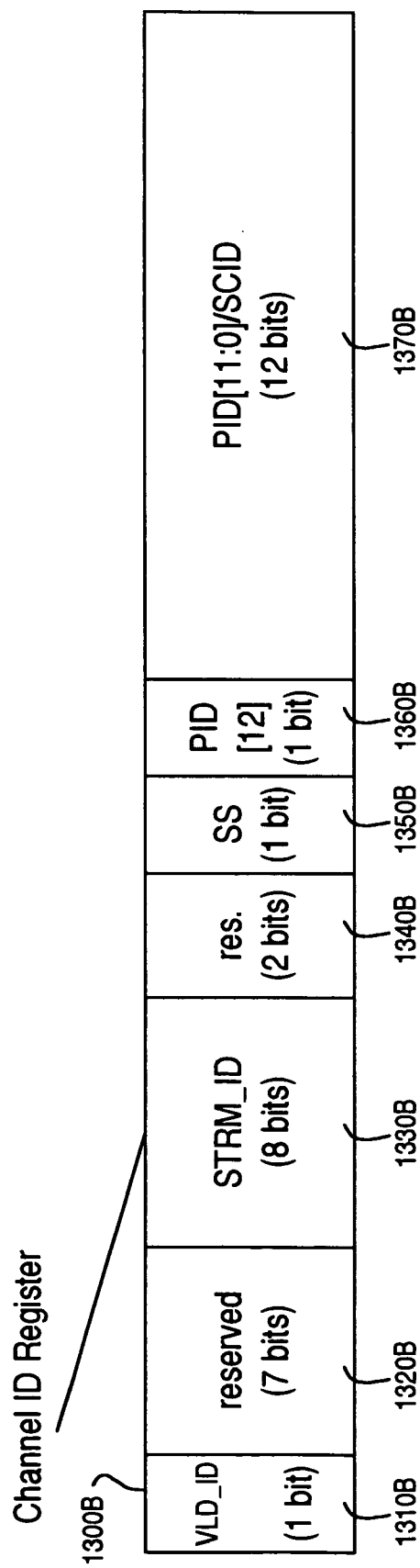
FIG. 13B illustrates a channel ID register in accordance with an embodiment of the present invention.

Continuing with FIG. 11A, at step 1103 the transport stream parser 900 is waiting for the beginning of a TS packet. The transport stream parser 900 is programmed by the host system to search in the TS packet header for a particular programmed packet_identification (PID) or Service Channel Identification (SCID) associated with a particular program. Alternatively, the transport stream parser 900 can be programmed to search in the TS packet header for several programmed packet_identifications (PID) or Service Channel Identifications (SCID) associated with several programs. In an embodiment, the transport stream parser 900 can be programmed to process the TS packets for more than one program. The transport stream parser 900 can be programmed by programming one or more channel ID registers. The channel ID register has fields that provide the criteria for selecting TS packets from the transport stream of a program. FIG. 13B illustrates a channel ID register 1300B in accordance with an embodiment of the present invention. For each program processed by the transport stream parser 900, there is a corresponding channel ID register 1300B used to program the transport stream parser 900 to process the TS packets for the corresponding program. For example, two channel ID registers are needed to program the transport stream parser 900 to process the TS packets for the two programs. The channel ID register 1300B has a PID[11:0]/SCID field 1370B which is 12 bits long, a PID[12] field 1360B which is 1 bit long, a Stream Select (SS) field 1350B which is 1 bit long, a first reserved field 1340B which is 2 bits long, a STRM_ID field 1330B which is 8 bits long, a second reserved field 1320B which is 7 bits long, and a VLD_ID field 1310B which is 1 bit long. It should be understood that the channel ID register 1300B can have other configurations.

The PID[11:0]/SCID field 1370B has the lower 12 bits of the programmed PID in the case of DVB TS packets. In the case of DSS TS packets, the PID[11:0]/SCID field 1370B has the 12 bits of the programmed SCID. In an embodiment, the programmed PID and the programmed SCID are set by the host system or set top box 100.

The PID[12] field 1360B has the upper bit of programmed PID in the case of DVB TS packets. In the case of DSS TS packets, the PID[12] field 1360B is not used.

The Stream Select (SS) field 1350B determines whether to process the transport stream received from a first input stream source (e.g., a first input port 71) or from a second input stream source (e.g., a second input port 72). As described in FIG. 1, the interface module 50 has a first input port 71 and a second input port 72. It should be understood that the length of the Stream Select (SS) field 1350B can be expanded if the interface module 50 has more than two input ports.

The STRM_ID field 1330B has the programmed stream_id (SI) (i.e., identify the start of a video PES packet of a particular program). As described above, the programmed stream_id (SI) has the value 1110 xxxx to identify a video PES packet having MPEG video data.

The VLD_ID field 1310B is a flag which is set to 1 in order for the PID[11:0]/SCID field 1370B, the PID[12] field 1360B, and the Stream Select (SS) field 1350B to be valid.

Figure 12:
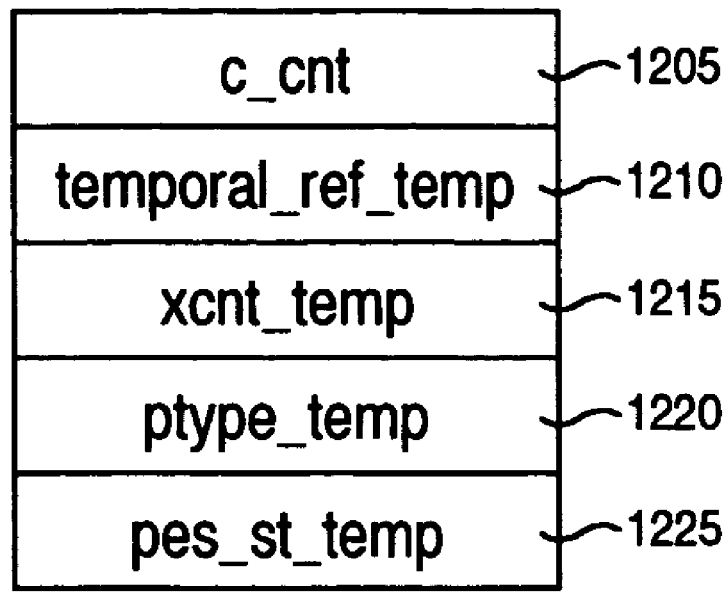
FIG. 12 illustrates an internal counter and a plurality of storage bits utilized by a transport stream parser in accordance with an embodiment of the present invention.

Continuing with FIG. 11A, at step 1104 the transport stream parser 900 initializes an internal counter and initializes a plurality of storage bits which store the parsing result codes (FIG. 8) for the parsing result word 800, whereas the parsing result codes are determined by scanning the data payload of selected TS packets, as described above. FIG. 12 illustrates an internal counter c_cnt 1205 and a plurality of storage bits 1210–1225 utilized by a transport stream parser 900 in accordance with an embodiment of the present invention. Initially, the internal counter c_cnt 1205 is loaded with the value 6. The temporal_ref_temp 1210 stores the value for the T_REF code 850 of the parsing result word 800. The xcnt_temp 1215 stores the value for the XCNT code 830 of the parsing result word 800. The ptype_temp 1220 stores the value for the PTYPE code 820 of the parsing result word 800. The pes_st_temp 1225 stores the value for the PES_ST code 810 of the parsing result word 800. Initially, the transport stream parser 900 sets the bits of the temporal_ref_temp 1210, the xcnt_temp 1215, the ptype_temp 1220, and the pes_st_temp 1225 to 0.

Furthermore, at step 1105 the transport stream parser 900 receives a TS packet from an input stream source (e.g., input port 71 or input port 72 of the interface module 50 in FIG. 1). The Stream Select (SS) field 1350B of the channel ID register(s) 1300B determines the input stream source.

At step 1106, the transport stream parser 900 allows the miscellaneous data (e.g., a routing control word, a time stamp, etc.) preceding the TS packet header to pass through without being scanned. The transport stream parser 900 starts searching the TS packet for the first plurality of codes after the end of the miscellaneous data and beginning with the first byte of the TS packet header.

Moreover, at step 1107, the transport stream parser 900 begins processing the TS packet header as determined by the transport stream type bit 1320A of the parser control register 1300A. If the transport stream type bit 1320A is 0, the transport stream parser 900 is configured to process DVB TS packets and proceeds to step 1108A. If the transport stream type bit 1320A is 1, the transport stream parser 900 is configured to process DSS TS packets and proceeds to step 1108B.

In the case of a DVB TS packet, at step 1108A, the transport stream parser 900 reads the first four bytes of the DVB TS packet (i.e., the packet header) as illustrated in FIGS. 2A, 3A, and 3B.

Continuing at step 1109A, the transport stream parser 900 determines whether the 13-bit PID (packet_identification) field of the DVB TS packet header matches the 13-bit programmed PID in any of the channel ID register(s) 1300B. If the 13-bit PID field does not match any 13-bit programmed PID, the method proceeds to step 1112.

Otherwise, at step 1110A, the transport stream parser 900 determines whether the AF (adaptation_field_control) field of the DVB TS packet header has the value 01 or 11. As described above, if the AF has a value of 01, the data payload of the DVB TS packet does not have an adaptation field and has only data such as MPEG data formatted into PES packets. Moreover, if the AF has a value of 11, the data payload of the DVB TS packet has an adaptation field followed by data such as MPEG data formatted into PES packets. Thus, if the AF field has a value other than 01 or 11, the method proceeds to step 1112. Otherwise, the method continues to step 1114 so that the data payload of the DVB TS packet can be scanned for the second plurality of codes to determine the parsing result codes.

In the case of a DSS TS packet, at step 1108B, the transport stream parser 900 reads the first three bytes of the DVB TS packet (i.e., the packet header and the CC and HD fields) as illustrated in FIGS. 2B, 4A, and 4B.

Continuing at step 1109B, the transport stream parser 900 determines whether the 12-bit SCID (Service Channel Identification) field of the DSS TS packet header matches the 12-bit programmed SCID in any of the channel ID register(s) 1300B. If the 12-bit SCID field does not match any 12-bit programmed SCID, the method proceeds to step 1112.

Otherwise, at step 1110B, the transport stream parser 900 determines whether the HD (Header Designator) field of the DSS TS packet header has the value 01x0 or 1xx0. As described above, if the HD has a value of 01x0 the data payload of the DSS TS packet does not have non-MPEG data/redundant data and has only MPEG video data formatted into PES packets. Moreover, if the HD has a value of 1xx0, the data payload of the DSS TS packet has non-MPEG data/redundant data followed by MPEG video data formatted into PES packets. Thus, if the HD field has a value other than 01x0 or 1xx0, the method proceeds to step 1112. Otherwise, the method continues to step 1114 so that the data payload of the DSS TS packet can be scanned for the second plurality of codes to determine the parsing result codes.

At step 1112, the transport stream parser 900 allows the data payload of the TS packet (e.g., DVB TS packet or DSS TS packet) to pass through without being scanned for the second plurality of codes. Then, the method proceeds to step 1140 (FIG. 11C).

Figure 11B:
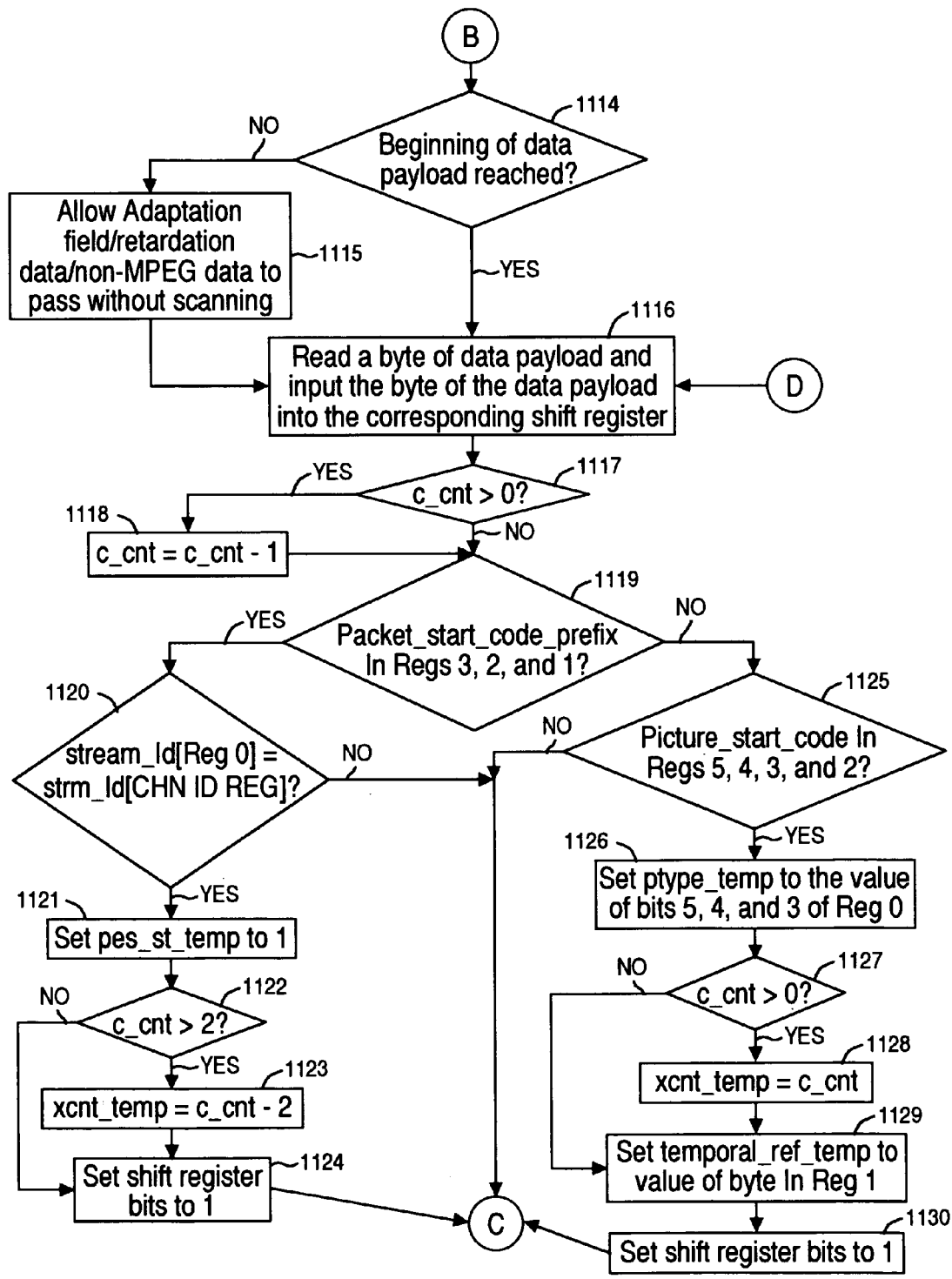
Figure 11C:
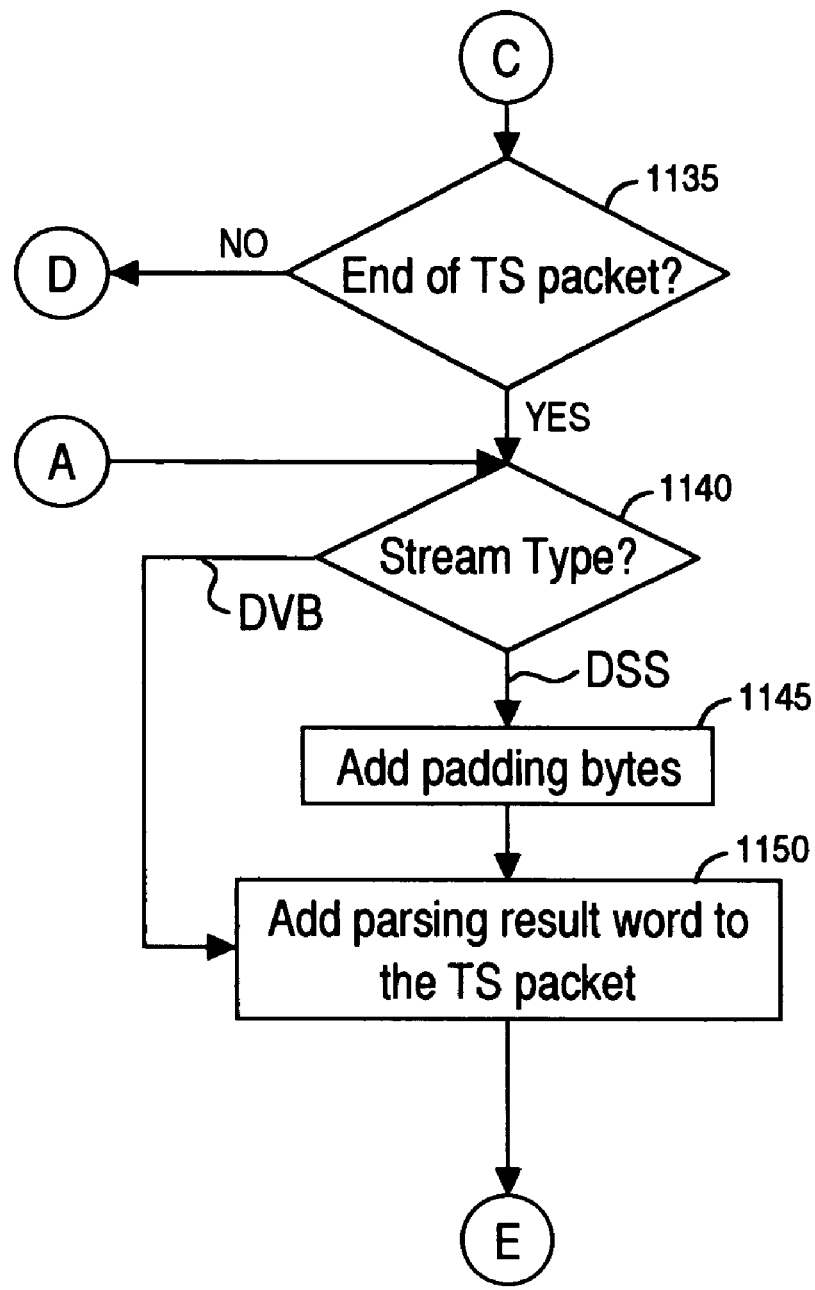

Now referring to FIG. 11B, at step 1114, the transport stream parser 900 determines whether the beginning of the data payload has been reached. In the case of a DVB TS packet, if the AF field has the value 11, the method proceeds to step 1115. In the case of a DSS TS packet, if the HD has the value 1xx0, the method proceeds to step 1115. Otherwise, the method proceeds to step 1116.

At step 1115, the transport stream parser 900 allows the adaptation field (in the case of DVB TS packets) and the redundant data/non-MPEG data field (in the case of DSS TS packet) to pass through without being scanned for the second plurality of codes. The transport stream parser 900 starts searching in the data payload for the second plurality of codes after the end of the adaptation field or the redundant data/non-MPEG data field.

Continuing at step 1116, the transport stream parser 900 reads a byte of the data payload of the TS packet (DVB TS packet or DSS TS packet) and inputs the byte of the data payload into the corresponding shift register 1100 (FIG. 10) of the scanning circuit 1000 (FIG. 10). In an embodiment, the scanning circuit 1000 includes a separate shift register for each program being processed by the transport stream parser 900.

At step 1117, the transport stream parser 900 determines the value of the internal counter c_cnt 1205 (FIG. 12). If the internal counter c_cnt 1205 has a value greater than 0, the method proceeds to step 1118. Otherwise, the method proceeds to step 1119.

Continuing at step 1118, the transport stream parser 900 sets the value of the internal counter c_cnt 1205 as follows:

$$c\_cnt=c\_cnt-1 \qquad \text{(Eq. 1)}$$

At step 1119, the transport stream parser 900 determines whether the packet_start_code_prefix (PSCP) (i.e., 0000 0000 0000 0000 0000 0001) is in register3 1030 through register1 1050 of the shift register 1100 (FIG. 10). In an embodiment, the detector2 1080 (FIG. 10) detects the packet_start_code_prefix (PSCP). If the packet start code prefix (PSCP) is not found, the method proceeds to step 1125.

Otherwise, at step 1120, the transport stream parser 900 determines whether the stream_id (SI) code (which is a byte) in register0 1060 (FIG. 10) matches the STRM_ID field 1330B of the channel ID register 1300B, whereas the STRM_ID field 1330B has the particular programmed stream_id (SI) associated with a video PES packet of a particular program. As described above, the particular programmed stream_id (SI) has the value 1110 xxxx to identify a video PES packet. In an embodiment, the comparator 1090 (FIG. 10) compares the stream_id (SI) code in register0 1060 (FIG. 10) with the STRM_ID field 1330B of the channel ID register 1300B upon receiving an enable signal from the detector2 1080. If the stream_id (SI) code in registers 1060 (FIG. 10) does not match the STRM_ID field 1330B of the channel ID register 1300B, the method proceeds to step 1135.

Otherwise, at step 1121, the transport stream parser 900 sets to 1 the value of the pes_st_temp 1225 (FIG. 12), indicating a stream_id (SI) which identifies the beginning of a video PES packet is located in the data payload of the selected TS packet.

Continuing at step 1122, the transport stream parser 900 determines the value of the internal counter c_cnt 1205 (FIG. 12). If the internal counter c_cnt 1205 has a value greater than 2, the method proceeds to step 1123, indicating that one or more bytes of the packet_start_code_prefix (PSCP) are located in the data payload of a previous selected TS packet. Otherwise, the method proceeds to step 1124.

At step 1123, the transport stream parser 900 sets the value of the xcnt_temp 1215 (FIG. 12) as follows:

$$xcnt\_temp = c\_cnt - 2 \qquad (\text{Eq. 2})$$

For example, if the internal counter c_cnt 1205 (FIG. 12) is 5, the xcnt_temp 1215 (FIG. 12) is set to 3, indicating that the three bytes of the packet_start_code_prefix (PSCP) are located in the data payload of a previous selected TS packet.

Furthermore, at step 1124, the transport stream parser 900 sets to 1 the bits in the shift register 1100. Then, the method proceeds to step 1135.

Continuing after step 1119, at step 1125 the transport stream parser 900 determines whether the picture start_code (PSC) (i.e., 0000 0000 0000 0000 0000 0001 0000 0000) is in registerS 1010 through register2 1040 of the shift register 1100 (FIG. 10). In an embodiment, the detector1 1070 (FIG. 10) detects the picture_start_code (PSC). If the picture_start_code (PSC) is not found, the method proceeds to step 1135 (FIG. 11C).

Otherwise, at step 1126, the transport stream parser 900 sets the ptype_temp 1220 (FIG. 12) to the value of bit 5, bit 4, and bit 3 of the byte in register0 1060, indicating the byte containing the picture_coding_type (PCT) 630C (FIG. 6C) is located in the data payload of the selected TS packet (i.e., identifying the start of a MPEG video frame such as a I-Frame, a B-Frame, a P-Frame).

Continuing at step 1127, the transport stream parser 900 determines the value of the internal counter c_cnt 1205 (FIG. 12). If the internal counter c_cnt 1205 has a value greater than 0, the method proceeds to step 1128, indicating that one or more bytes of the combination of picture_start_code (PSC) 610C (FIG. 6C) and temporal_reference (TR) 620C (FIG. 6C) are located in the data payload of a previous selected TS packet. Otherwise, the method proceeds to step 1129.

At step 1128, the transport stream parser 900 sets the value of the xcnt_temp 1215 (FIG. 12) as follows:

$$xcnt\_temp = c\_cnt \qquad (\text{Eq. 2})$$

For example, if the internal counter c_cnt 1205 (FIG. 12) is 5, the xcnt_temp 1215 (FIG. 12) is set to 5, indicating that five bytes of the combination of picture_start_code (PSC) 610C (FIG. 6C) and temporal_reference (TR) 620C (FIG. 6C) are located in the data payload of a previous selected TS packet.

Moreover, at step 1129, the transport stream parser 900 sets the temporal_ref_temp 1210 (FIG. 12) to the value of the byte in register1 1050, whereas the byte in register1 1050 is the upper 8 bits of the temporal_reference (TR) 620C (FIG. 6C) in the picture header 600C (FIG. 6C).

Furthermore, at step 1130, the transport stream parser 900 sets to 1 the bits in the shift register 1100. Then the method proceeds to step 1135 (FIG. 11C).

Referring to FIG. 11C, at step 1135, the transport stream parser 900 determines whether the end of the data payload of the selected TS packet has been reached. The transport stream parser 900 allows the miscellaneous data following the data payload of the selected TS packet to pass through without being scanned. If the end of the selected TS packet has not been reached, the method proceeds to step 1116 (FIG. 11B).

Otherwise at step 1140, the transport stream parser 900 continues processing the TS packet as determined by the transport stream type bit 1320A of the parser control register 1300A. If the transport stream type bit 1320A is 0, the transport stream parser 900 is configured to process DVB TS packets and proceeds to step 1150. If the transport stream type bit 1320A is 1, the transport stream parser 900 is configured to process DSS TS packets and proceeds to step 1145.

At step 1145, in the case of the DSS TS packet, the transport stream parser 900 adds two bytes of padding bytes to the end of the DSS TS packet.

Furthermore, at step 1150, the transport stream parser 900 adds a parsing result word 800 (FIG. 8) having the parsing result codes to the TS packet (DVB TS packet or DSS TS packet). In an embodiment, the parsing result word 800 is appended to the end of the TS packet. In particular, the PES_ST code 810 (FIG. 8) is set to the value of pes_st_temp 1225 (FIG. 12), the PTYPE code 820 is set to the value of ptype_temp 1220, the XCNT code 830 is set to the value of xcnt_temp 1215, and the T_REF code 850 is set to the value of temporal_ref_temp 1210. Moreover, the transport stream parser 900 sets to 0 the reserved bit 840, and the 16-bit field 860 of the parsing result word 800. More importantly, the transport stream parser 900 appends a parsing result word 800 having the bits set to the value 0 to TS packets that are not selected for scanning for the second plurality of codes in the data payload.

The method then proceeds to step 1102 (FIG. 11A) to process another TS packet.

Figure 14:
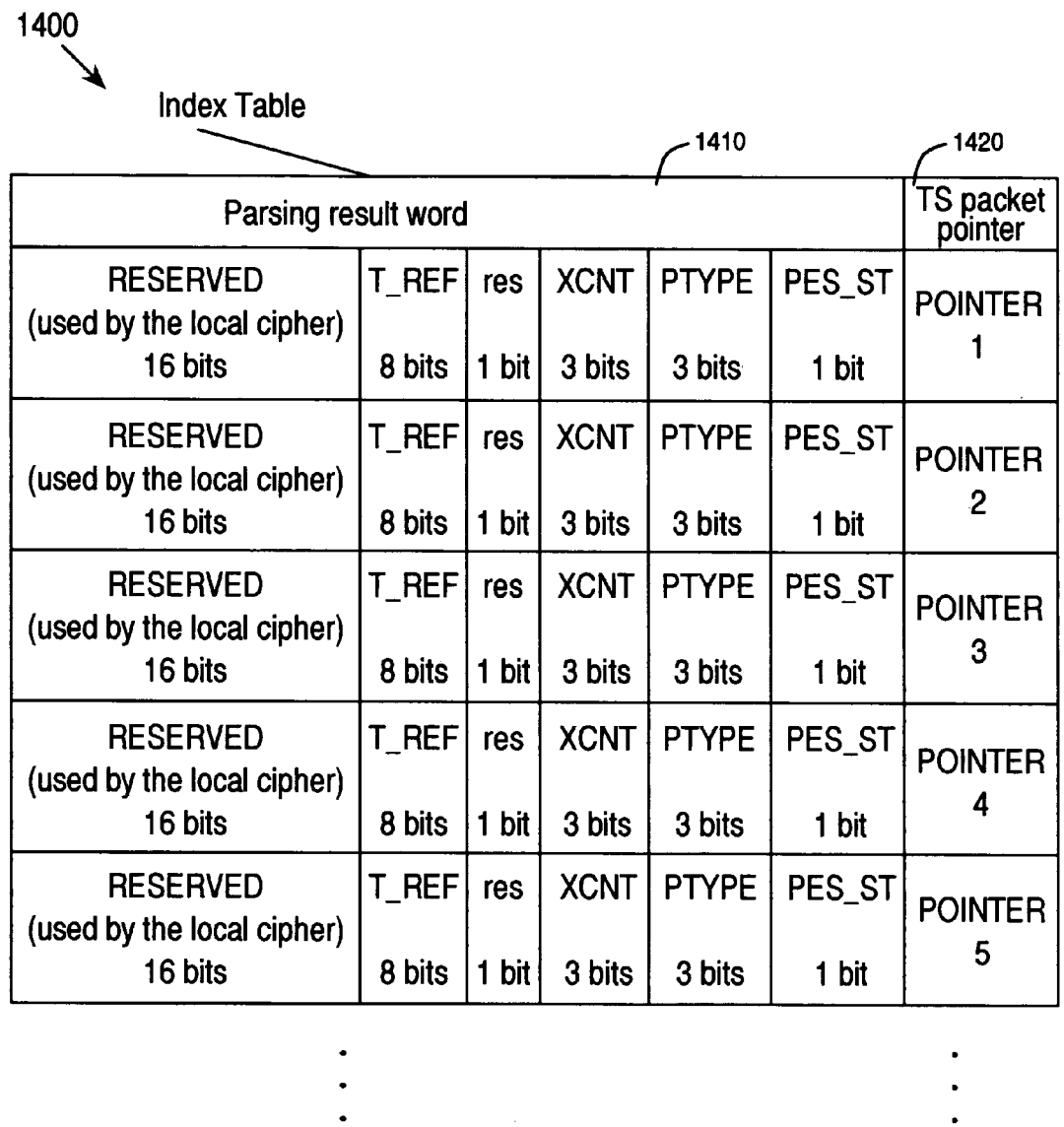
FIG. 14 illustrates an index table in accordance with an embodiment of the present invention.

FIG. 14 illustrates an index table 1400 in accordance with an embodiment of the present invention. Referencing FIG. 1, as the TS packets are routed to the mass storage device 10 from the main memory 20, the parsing result word 800 (FIG. 8) in each TS packet is identified (since the parsing result word 800 is not encrypted by the local cipher) and used by the host processor 30 (which executes host software) to generate the index table 1400. The index table 1400 indicates to the host processor 30 the TS packets in which the start of a video PES and/or the start of a MPEG video frame are located. Hence, during Trick Mode operation (e.g. fast forward, fast reverse, slow motion, freeze frame, slow reverse), the host processor 30 is able to send to the MPEG decoder 40 the particular TS packets having particular MPEG video frames (e.g., I-Frames) rather than sending both unnecessary and necessary TS packets which can then overwhelm the MPEG decoder 40 attempting to perform a Trick Mode operation.

As illustrated in FIG. 14, each entry in the index table 1400 has two fields. The first field 1410 has the parsing result word 800 (FIG. 8) associated with the TS packet. The second field 1420 has a packet pointer used to locate the TS packet in the mass storage device 10 (FIG. 1). It should be understood that the index table 1400 can have other configurations.

The XCNT code 830 of the parsing result code 800 allows the host processor 30 to instruct the MPEG decoder 40 that one or more bytes of the packet_start_code_prefix (PSCP) are located in the data payload of a prior TS packet or that one or more bytes of the combination of picture_start_code (PSC) 610C (FIG. 6C) and temporal_reference (TR) 620C (FIG. 6C) are located in the data payload of a prior TS packet. Otherwise, the MPEG decoder 40 will attempt to find the entire packet_start_code_prefix (PSCP) (i.e., 0000 0000 0000 0000 0000 0001) or the entire combination of picture_start_code (PSC) 610C (FIG. 6C) and temporal_reference (TR) 620C (FIG. 6C) in the current TS packet.

Moreover, the T_REF code 850 (FIG. 8) allows the host processor 30 to provide to the MPEG decoder 40 the upper 8 bits of the temporal_reference (TR) 620C (FIG. 6C), which otherwise may be located in a prior TS packet rather than in the current TS packet. Thus, the present invention avoids sending the prior TS packet to the MPEG decoder 40 during a Trick Mode operation, improving the performance of the MPEG decoder 40 performing a Trick Mode operation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of processing a data stream having a plurality of packets, comprising the steps of:
    a) setting a plurality of parsing result codes to an initial value;
    b) receiving a particular packet of said plurality of packets;
    c) searching for a first plurality of codes in a plurality of fields in a first portion of said particular packet;
    d) if said first plurality of codes are found in said first portion, selecting a data payload of said particular packet;
    e) scanning for a second plurality of codes in said data payload of said particular packet;
    f) if one of said second plurality of codes is found, determining one or more of said parsing result codes;
    g) adding said plurality of parsing result codes to said particular packet; and
    h) repeating said steps a) through g) for each of said plurality of packets.

2. A method as recited in claim 1 further comprising the step of:
    creating an index table having a plurality of entries each having a first field and a second field, wherein said first field has said parsing result codes and said second field has a packet pointer associated with one of said packets.

3. A method as recited in claim 2 further comprising the step of:
    using said index table to select one or more of said packets to send to a decoder, wherein said index table facilitates decoding said packets.

4. A method as recited in claim 1 wherein a format of said data stream is a transport stream compliant with a Digital Video Broadcast (DVB) standard, wherein said transport stream includes MPEG data, and wherein said plurality of fields includes a first field having an adaptation field control (AF) code and a second field having a packet identification (PID) code.

5. A method as recited in claim 4 wherein if said adaptation field control (AF) code has a predetermined value, starting said step e) after an end of an initial portion of said data payload of said particular packet.

6. A method as recited in claim 1 wherein a format of said data stream is a transport stream compliant with a Digital Satellite System (DSS) broadcast standard, wherein said transport stream includes MPEG data, and wherein said plurality of fields includes a first field having a Service Channel Identification (SCID) code, and a second field having a Header Designator (HD) code.

7. A method as recited in claim 6 wherein if said Header Designator (HD) code has a predetermined value, starting said step e) after an end of an initial portion of said data payload of said particular packet.

8. A method as recited in claim 6 wherein said step g) includes adding a padding code to each packet.

9. A method as recited in claim 1 wherein said second plurality of codes includes a first code representing a start of a video PES (packetized elementary stream) packet having MPEG video data and a second code representing a start of a MPEG video frame.

10. A method as recited in claim 9 wherein said step e) includes scanning for said second plurality of codes in said data payload of said particular packet and in an end portion of a second data payload of a prior packet which has said first plurality of codes.

11. A method as recited in claim 10 wherein said plurality of parsing result codes includes a first field having a code indicating upper bits of a temporal reference code, a second field having a code indicating whether one of said first and second codes is partitioned into said particular packet and said prior packet, a third field having a code indicating whether a picture coding type code was found in said particular packet, and a fourth field having a code indicating whether a stream id code which identifies MPEG video data was found in said particular packet.

12. A method of processing a data stream having a plurality of packets, comprising the steps of:
    a) searching for a first plurality of codes in a first portion of each packet to determine whether to select an associated data payload of said packet and setting a plurality of parsing result codes to an initial value;
    b) if said associated data payload of said packet is selected, scanning for a second plurality of codes in said associated data payload of said packet to determine one or more of said plurality of parsing result codes; and
    c) adding said plurality of parsing result codes to each packet.

13. A method as recited in claim 12 further comprising the step of:
    creating an index table having said parsing result codes and a plurality of packet pointers indicating where said packets are located in a mass storage device.

14. A method as recited in claim 13 further comprising the step of:
    using said index table to select one or more of said packets to send to a decoder, wherein said index table facilitates decoding said packets.

15. A method as recited in claim 12 wherein a format of said data stream is a transport stream compliant with a Digital Video Broadcast (DVB) standard, wherein said transport stream includes MPEG data, and wherein said first portion includes a first field having an adaptation field control (AF) code and a second field having a packet identification (PID) code.

16. A method as recited in claim 15 wherein if said adaptation field control (AF) code has a predetermined value, starting said step b) after an end of an initial portion of said associated data payload of said packet.

17. A method as recited in claim 12 wherein a format of said data stream is a transport stream compliant with a Digital Satellite System (DSS) broadcast standard, wherein said transport stream includes MPEG data, and wherein said first portion includes a first field having a Service Channel Identification (SCID) code, and a second field having a Header Designator (HD) code.

18. A method as recited in claim 17 wherein if said Header Designator (HD) code has a predetermined value, starting said step b) after an end of an initial portion of said associated data payload of said packet.

19. A method as recited in claim 17 wherein said step c) includes adding a padding code to each packet.

20. A method as recited in claim 12 wherein said second plurality of codes includes a first code representing a start of a video PES (packetized elementary stream) packet having MPEG video data and a second code representing a start of a MPEG video frame.

21. A method as recited in claim 20 wherein said step b) includes scanning for said second plurality of codes in said associated data payload of said packet and in an end portion of a data payload of a prior packet which has said first plurality of codes to determine one or more of said plurality of parsing result codes.

22. A method as recited in claim 21 wherein said plurality of parsing result codes includes a first field having a code indicating upper bits of a temporal reference code, a second field having a code indicating whether one of said first and second codes is partitioned into said packet and said prior packet, a third field having a code indicating whether a picture coding type code was found in said packet, and a fourth field having a code indicating whether a stream id code which identifies MPEG video data was found in said packet.

23. An apparatus for parsing a data stream having a plurality of packets in a host system which includes a host processor, comprising:
 a first circuit configured to search for a first plurality of codes in a plurality of fields in a first portion of each packet to select particular packets from said plurality of packets, wherein each particular packet has said first plurality of codes;
 a second circuit coupled to said first circuit, wherein said second circuit is configured to scan for a second plurality of codes in a data payload of each particular packet to determine one or more of a plurality of parsing result codes; and
 a third circuit coupled to said first circuit, wherein said third circuit is configured to add said plurality of parsing result codes to each packet.

24. An apparatus as recited in claim 23 wherein said host processor uses said plurality of parsing result codes of each packet to generate an index table, wherein said host system includes a mass storage device, and wherein said index table has said parsing result codes and a plurality of packet pointers indicating where said packets are located in said mass storage device.

25. An apparatus as recited in claim 24 wherein said host processor uses said index table to select one or more of said packets to send to a decoder, and wherein said index table facilitates decoding said packets.

26. An apparatus as recited in claim 23 wherein a format of said data stream is a transport stream compliant with a Digital Video Broadcast (DVB) standard, wherein said transport stream includes MPEG data, and wherein said first portion includes a first field having an adaptation field control (AF) code and a second field having a packet identification (PID) code.

27. An apparatus as recited in claim 26 wherein if said adaptation field control (AF) code has a predetermined value, said second circuit starts scanning for said second plurality of codes after an end of an initial portion of said data payload of said particular packet to determine one or more of said plurality of parsing result codes.

28. An apparatus as recited in claim 23 wherein a format of said data stream is a transport stream compliant with a Digital Satellite System (DSS) broadcast standard, wherein said transport stream includes MPEG data, and wherein said first portion includes a first field having a Service Channel Identification (SCID) code, and a second field having a Header Designator (HD) code.

29. An apparatus as recited in claim 28 wherein if said Header Designator (HD) code has a predetermined value, said second circuit starts scanning for said second plurality of codes after an end of an initial portion of said data payload of said particular packet to determine one or more of said plurality of parsing result codes.

30. An apparatus as recited in claim 28 wherein said third circuit is configured to add a padding code to each packet.

31. An apparatus as recited in claim 23 wherein said second plurality of codes includes a first code representing a start of a video PES (packetized elementary stream) packet having MPEG video data and a second code representing a start of a MPEG video frame.

32. An apparatus as recited in claim 31 wherein said second circuit is configured to scan for said second plurality of codes in said data payload of said particular packet and in an end portion of a data payload of a prior particular packet to determine one or more of said plurality of parsing result codes.

33. An apparatus as recited in claim 32 wherein said plurality of parsing result codes includes a first field having a code indicating upper bits of a temporal reference code, a second field having a code indicating whether one of said first and second codes is partitioned into said particular packet and said prior particular packet, a third field having a code indicating whether a picture coding type code was found in said particular packet, and a fourth field having a code indicating whether a stream id code which identifies MPEG video data was found in said particular packet.

34. An apparatus as recited in claim 23 wherein said plurality of parsing result codes are set to an initial value before searching each first portion of said plurality of packets.

35. An apparatus as recited in claim 23 wherein said second circuit includes:
 a shift register having a plurality of registers coupled in series;
 a first detector coupled to said shift register for detecting a first pattern of bits of one of said second plurality of codes in a first group of said registers;
 a second detector coupled to said shift register for detecting a second pattern of bits of one of said second plurality of codes in a second group of said registers; and
 a comparator coupled to said shift register for comparing a third pattern of bits in one of said registers with a fourth pattern of bits representing a particular code.

36. A method of processing a data stream having a plurality of packets, comprising the steps of:
  a) parsing said plurality of packets to determine a plurality of parsing result codes for each packet;
  b) adding said plurality of parsing result codes to each packet;
  c) creating an index table having said parsing result codes and a plurality of packet pointers indicating where said packets are located in a mass storage device;
  d) storing said packets; and
  e) selecting one or more of said stored packets to send to a decoder using said index table, wherein said index table facilitates decoding said packets.

37. A method as recited in claim 36 wherein said step a) includes:
  searching for a first plurality of codes in a first portion of each packet to determine whether to select an associated data payload of said packet and setting said plurality of parsing result codes to an initial value; and
  if said associated data payload of said packet is selected, scanning for a second plurality of codes in said associated data payload of said packet to determine one or more of said plurality of parsing result codes.

38. A method as recited in claim 37 wherein a format of said data stream is a transport stream compliant with a Digital Video Broadcast (DVB) standard, wherein said transport stream includes MPEG data, and wherein said first portion includes a first field having an adaptation field control (AF) code and a second field having a packet identification (PID) code.

39. A method as recited in claim 37 wherein a format of said data stream is a transport stream compliant with a Digital Satellite System (DSS) broadcast standard, wherein said transport stream includes MPEG data, and wherein said first portion includes a first field having a Service Channel Identification (SCID) code, and a second field having a Header Designator (HD) code.

40. A method as recited in claim 37 wherein said second plurality of codes includes a first code representing a start of a video PES (packetized elementary stream) packet having MPEG video data and a second code representing a start of a MPEG video frame.

41. A method as recited in claim 40 wherein said plurality of parsing result codes includes a first field having a code indicating upper bits of a temporal reference code, a second field having a code indicating whether one of said first and second codes is partitioned, a third field having a code indicating whether a picture coding type code was found in said packet, and a fourth field having a code indicating whether a stream id code which identifies MPEG video data was found in said packet.

* * * * *